(12) United States Patent
Okada

(10) Patent No.: US 11,582,401 B2
(45) Date of Patent: Feb. 14, 2023

(54) IMAGE SIGNAL PROCESSING DEVICE, IMAGING DEVICE, FLICKER CHECK METHOD IN IMAGING DEVICE, AND SERVER

(71) Applicant: SONY GROUP CORPORATION, Tokyo (JP)

(72) Inventor: Sohhei Okada, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/448,428

(22) Filed: Sep. 22, 2021

(65) Prior Publication Data

US 2022/0006943 A1 Jan. 6, 2022

Related U.S. Application Data

(62) Division of application No. 16/329,064, filed as application No. PCT/JP2017/037768 on Oct. 18, 2017, now Pat. No. 11,172,143.

(30) Foreign Application Priority Data

Oct. 27, 2016 (JP) .................................. 2016-210889

(51) Int. Cl.
   *H04N 5/235* (2006.01)
   *H04N 5/232* (2006.01)
(52) U.S. Cl.
   CPC .......... *H04N 5/2357* (2013.01); *H04N 5/232* (2013.01); *H04N 5/235* (2013.01); *H04N 5/23245* (2013.01); *H04N 5/23293* (2013.01)

(58) Field of Classification Search
   None
   See application file for complete search history.

(56) References Cited

U.S. PATENT DOCUMENTS

2008/0309791 A1 12/2008 Nishiwaki et al.
2010/0295970 A1 11/2010 Suzuki
(Continued)

FOREIGN PATENT DOCUMENTS

CN 104541499 A 4/2015
JP 2008-311854 A 12/2008
(Continued)

OTHER PUBLICATIONS

Office Action for JP Patent Application No. 2018-547608, dated Feb. 22, 2022, 03 pages of English Translation and 02 pages of Office Action.
(Continued)

*Primary Examiner* — Mark T Monk
(74) *Attorney, Agent, or Firm* — Chip Law Group

(57) ABSTRACT

This invention enables one to check flicker of a HFR image signal. A display image signal of a first frame rate for flicker check is obtained on the basis of an image signal of a second frame rate. For example, the display image signal of the first frame rate is generated from the image signal of the second frame rate by a frame thinning process. In this case, a frame to be thinned is determined from a relationship between the second frame rate and a light source frequency. For example, the number of frames to be a flicker period is obtained from the second frame rate and the light source frequency, and the frame to be thinned is determined so that continuous frames of the number of frames to be the flicker period are present.

20 Claims, 14 Drawing Sheets

(56) References Cited

U.S. PATENT DOCUMENTS

| | | | |
|---|---|---|---|
| 2011/0216240 A1 | 9/2011 | Ohno | |
| 2012/0257082 A1 | 10/2012 | Kato et al. | |
| 2013/0342726 A1* | 12/2013 | Ebina | H04N 5/23245 |
| | | | 348/226.1 |
| 2015/0172529 A1 | 6/2015 | Aota | |
| 2015/0229824 A1 | 8/2015 | Tanaka et al. | |
| 2016/0028933 A1 | 1/2016 | Kajiyama | |

FOREIGN PATENT DOCUMENTS

| | | |
|---|---|---|
| JP | 2009-135792 A | 6/2009 |
| JP | 2010-063169 A | 3/2010 |
| JP | 2010-272999 A | 12/2010 |
| JP | 2011-188101 A | 9/2011 |
| JP | 2012-129972 A | 7/2012 |
| JP | 2015-115922 A | 6/2015 |
| JP | 2016-025510 A | 2/2016 |
| WO | 2014/199542 A1 | 12/2014 |
| WO | 2016/063023 A1 | 4/2016 |

OTHER PUBLICATIONS

International Search Report and Written Opinion of PCT Application No. PCT/JP2017/037768, dated Dec. 19, 2017, 07 pages of ISRWO and 08 pages of English translation.

International Preliminary Report on Patentability of PCT Application No. PCT/JP2017/037768, dated May 9, 2019, 04 pages of IPRP and 08 pages of English translation.

Non-Final Office Action for U.S. Appl. No. 16/329,064, dated May 7, 2020, 19 pages.

Non-Final Office Action for U.S. Appl. No. 16/329,064, dated Jan. 13, 2021, 20 pages.

Non-Final Office Action for U.S. Appl. No. 16/329,064, dated Oct. 6, 2020, 22 pages.

Advisory Action for U.S. Appl. No. 16/329,064, dated Dec. 2, 2020, 02 pages.

Notice of Allowance for U.S. Appl. No. 16/329,064, dated Jul. 9, 2021, 12 pages.

Notice of Allowance for U.S. Appl. No. 16/329,064, dated Jul. 23, 2021, 02 pages.

* cited by examiner

FIG. 4
| ACM TYPE | WEIGHTING COEFFICIENT | | | | |
|---|---|---|---|---|---|
| | STANDARD FRAME | FRAME(-1F) | FRAME(-2F) | FRAME(-3F) | FRAME(-4F) |
| 1 | 2 | 1 | 0 | 0 | 0 |
| 2 | 3 | 2 | 1 | 0 | 0 |
| 3 | 4 | 3 | 2 | 1 | 0 |
FIG. 5
```
< FLICKER  REDUCTION >
  REDUCTION                    :  ON
  POWER  LINE  FREQUENCY       :  50Hz
  FLAME RATE                   :  120fps
  MODE
    ACM  TYPE                  :  1
```
FLICKER CHECK MODE
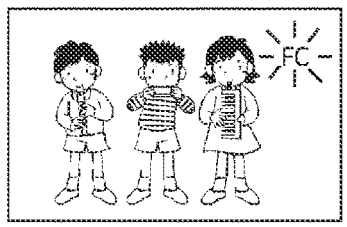
FIG. 6A
NORMAL PROCESS MODE
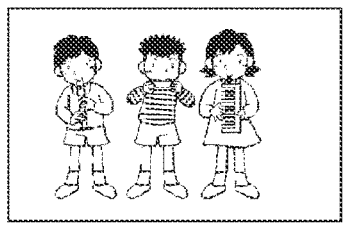
FIG. 6B

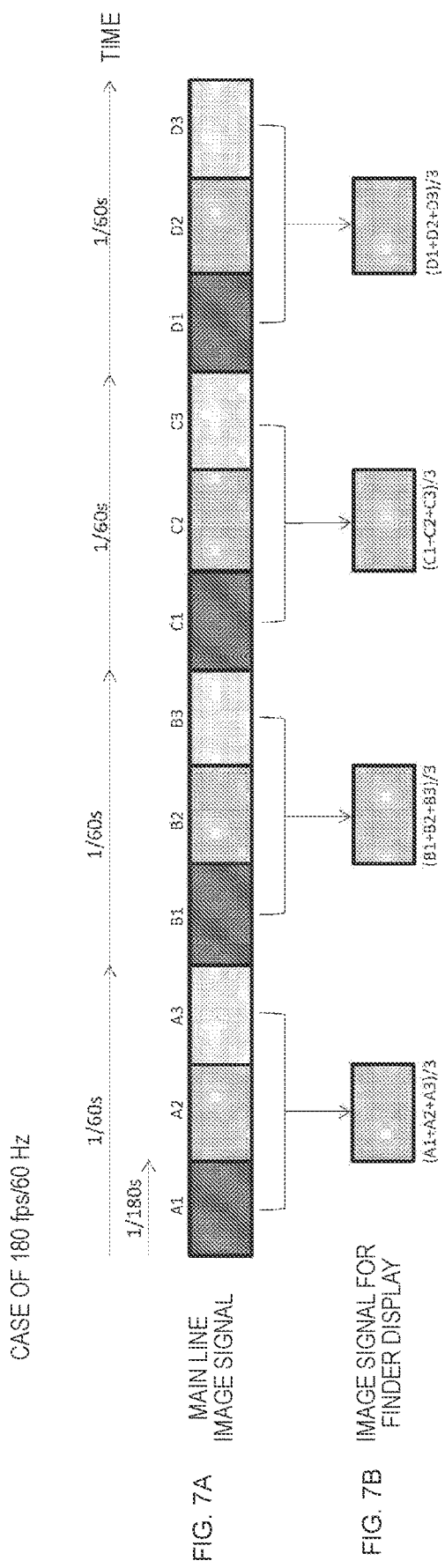

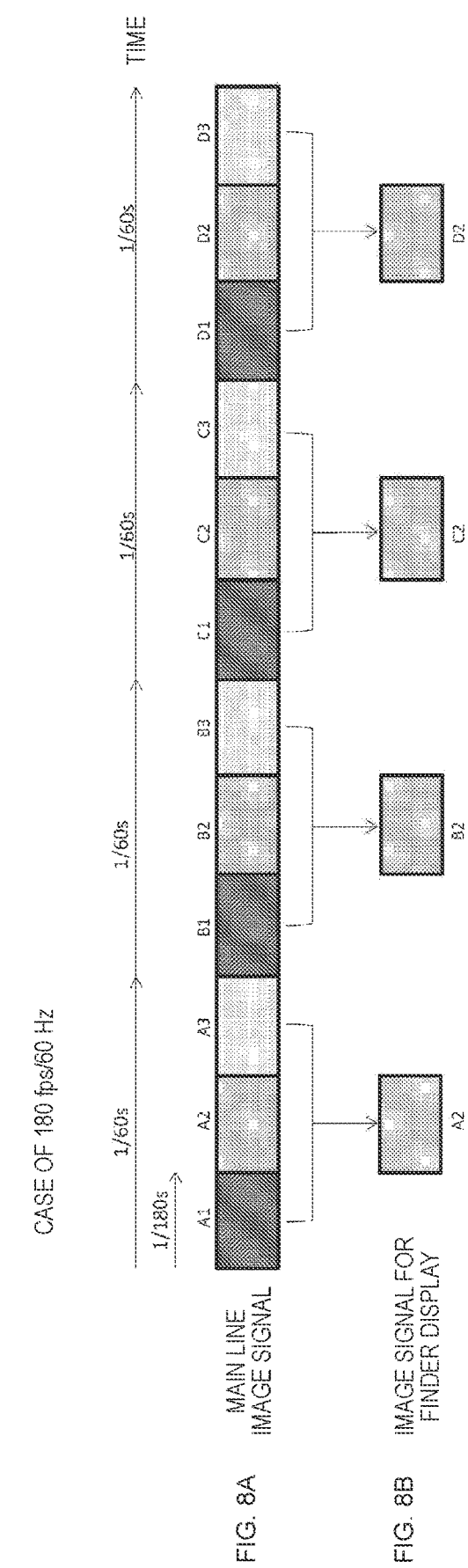

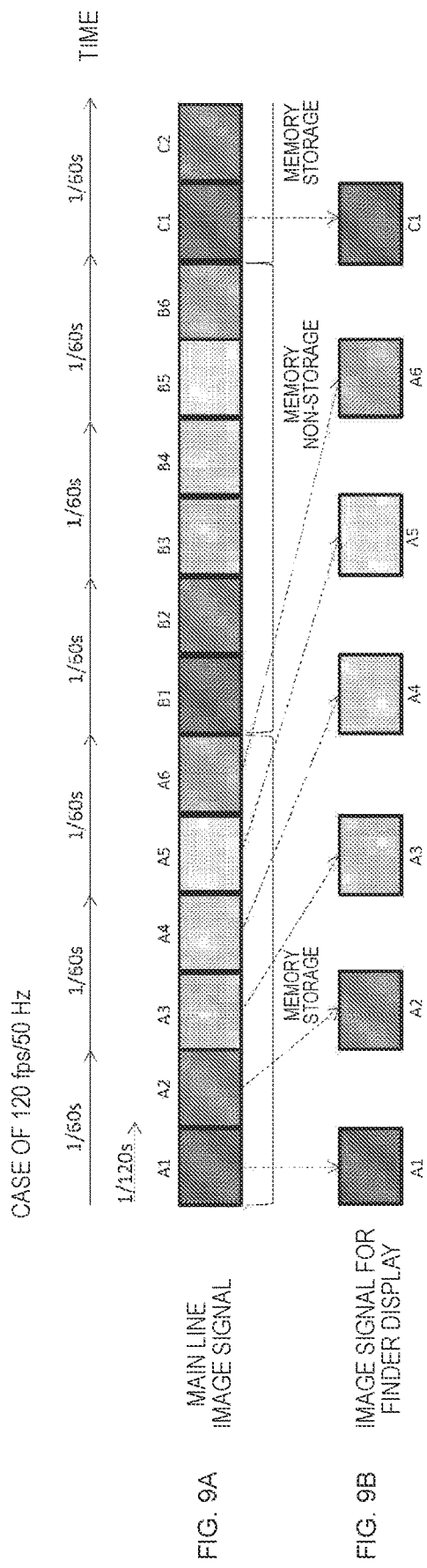

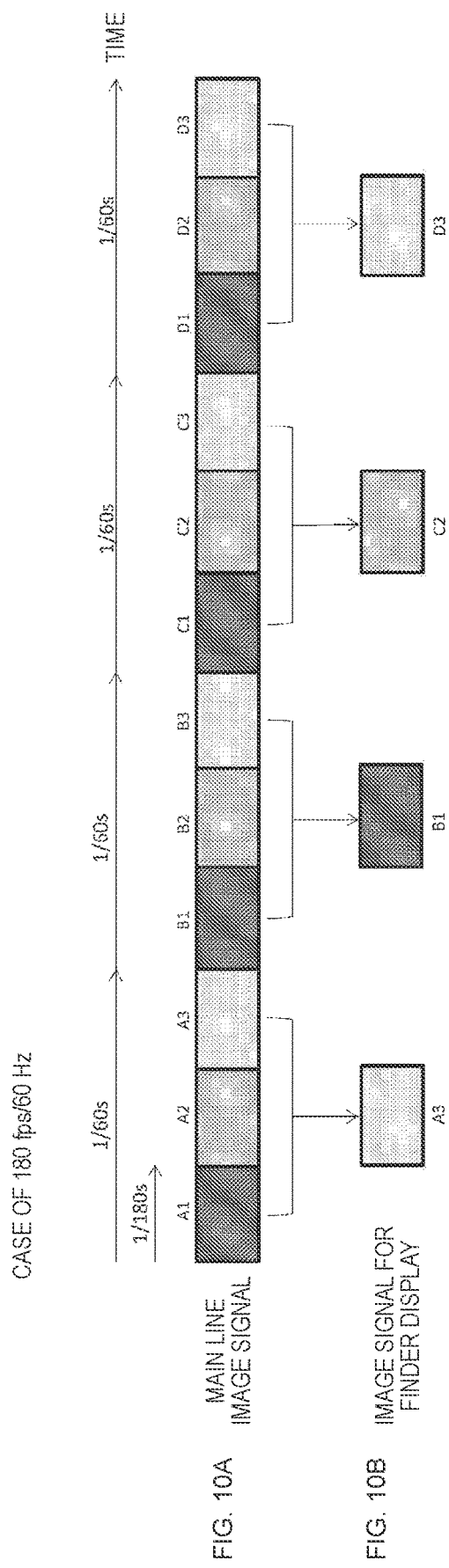

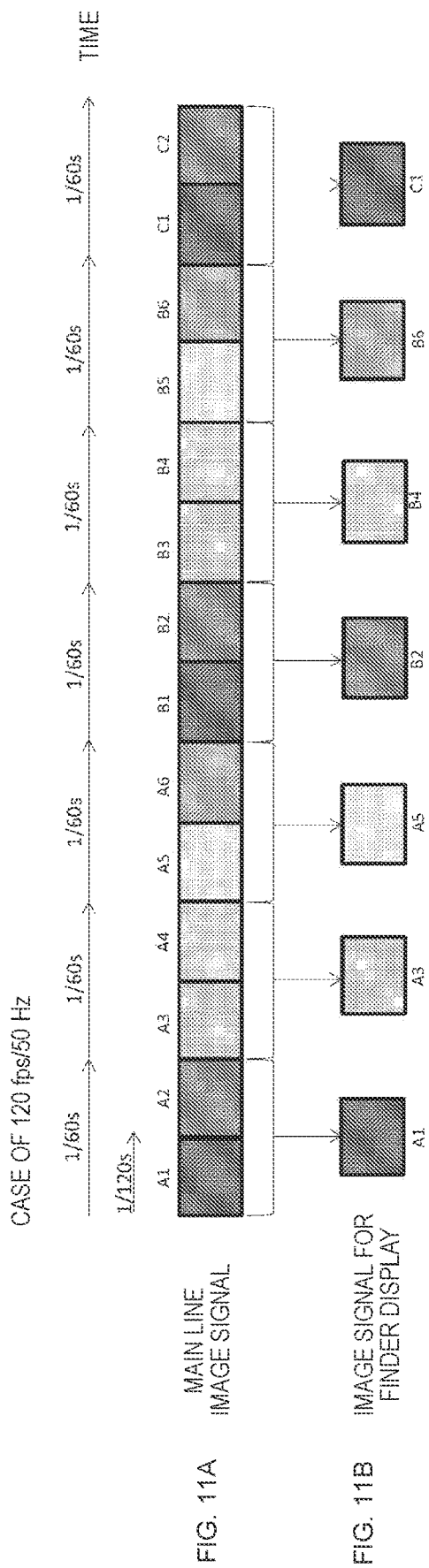

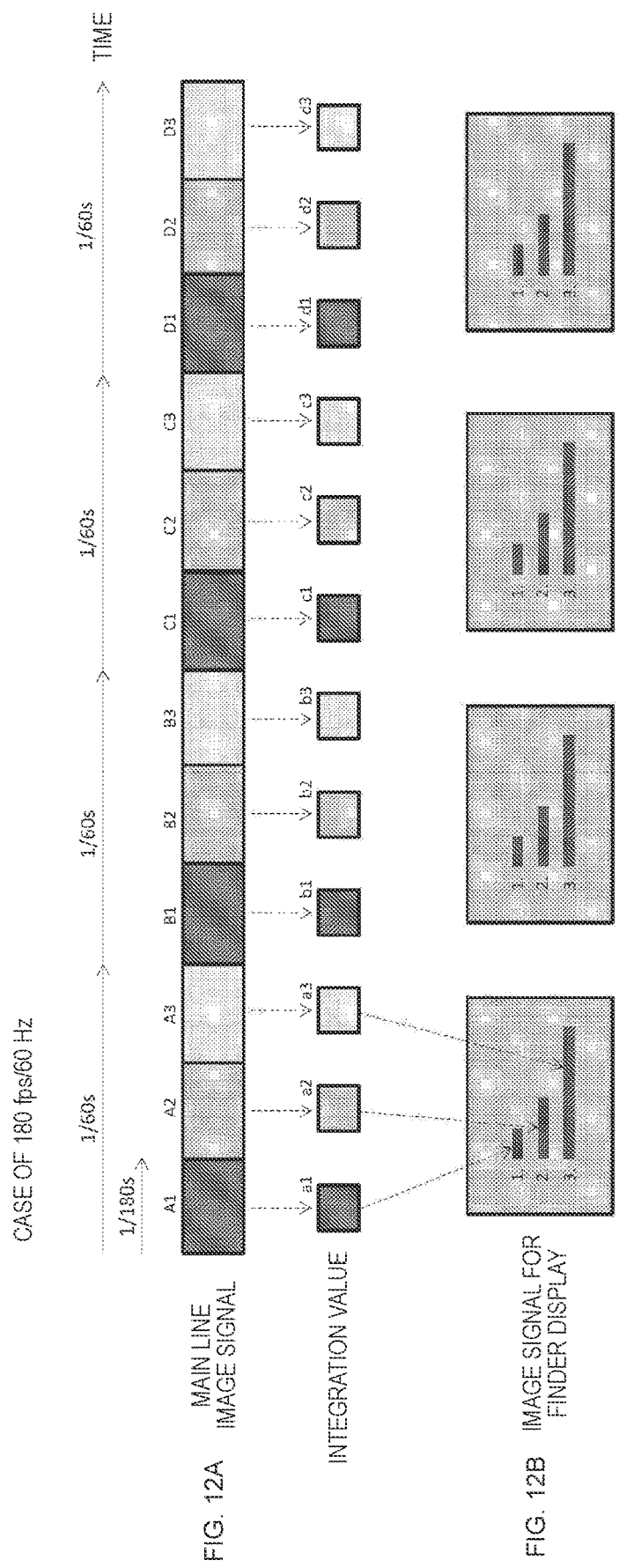

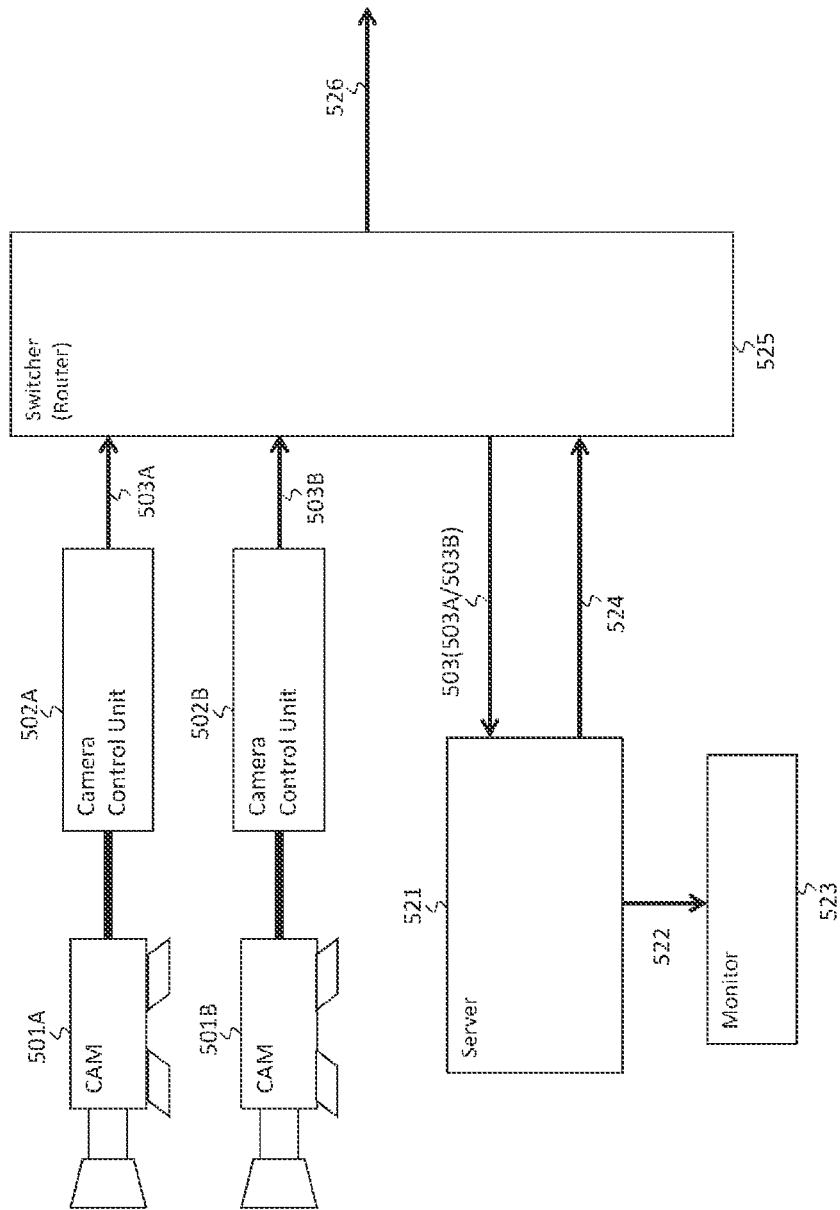

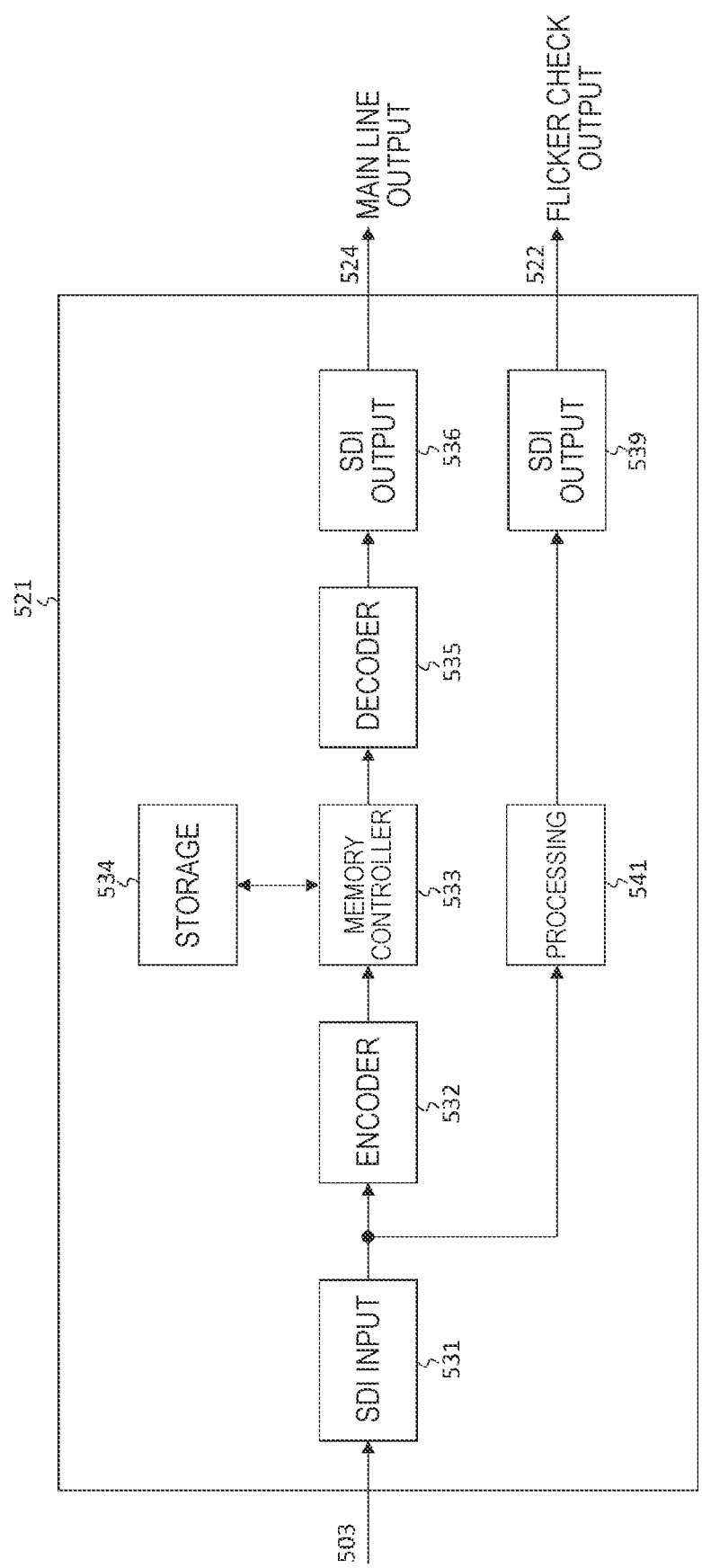

IMAGE SIGNAL PROCESSING DEVICE, IMAGING DEVICE, FLICKER CHECK METHOD IN IMAGING DEVICE, AND SERVER

CROSS REFERENCE TO RELATED APPLICATIONS

This application is a divisional application of U.S. patent application Ser. No. 16/329,064, filed on Feb. 27, 2019, which is a U.S. National Phase of International Patent Application No. PCT/JP2017/037768 filed on Oct. 18, 2017, which claims priority benefit of Japanese Patent Application No. JP 2016-210889 filed in the Japan Patent Office on Oct. 27, 2016. Each of the above-referenced applications is hereby incorporated herein by reference in its entirety.

TECHNICAL FIELD

The present technology relates to an image signal processing device, an imaging device, a flicker check method in an imaging device, and a server.

BACKGROUND ART

High frame rate cameras (HFR cameras) capable of imaging at a high frame rate with a frame rate higher than a standard frame rate have become widespread. A slow motion effect can be easily obtained by using the image signal obtained by imaging with an HFR camera. In photographing under a light source such as a fluorescent lamp that blinks due to a power supply frequency, flicker occurs as a phenomenon generated from a difference between a light source period and an imaging period. The flicker is more conspicuous especially in the HFR camera of which an imaging rate is higher than the light source frequency. For example, Patent Literature 1 discloses a technology for correcting flicker.

An HFR camera generally has a monitor output for checking the brightness, white balance, or the like of a picture being imaged in real time. It is desirable for the picture displayed on the monitor to be originally capable of faithfully displaying the brightness or the white balance of the picture being imaged. In the related art, for example, it is known that a monitor output of a high-quality standard frame rate with high S/N can be obtained by averaging in a frame direction, or a monitor output of a standard frame rate with high dynamic resolution can be obtained by thinning in a frame direction.

However, with such a monitor output, it is not possible to accurately check characteristic flicker in a captured image signal of the HFR camera. Flicker is a luminance change phenomenon in frame units appearing in a case in which an image is captured under a blinking light source. In a monitor output of a frame addition method, a luminance difference is lost by an addition, and the flicker is not able to be correctly expressed. Similarly, in the monitor output of the thinning method, since the luminance difference is not a continuous frame relationship, the luminance difference that appears is not correct.

In the related art, by recording the captured image signal of the HFR camera once on a recording medium and reproducing the captured image signal, the flicker is checked, and if necessary, a flicker correction function is used. However, even when a flicker correction effect is checked, it is necessary to record once and reproduce the captured image signal, and it takes time and effort for a user.

CITATION LIST

Patent Literature

Patent Literature 1: JP 2009-135792A

DISCLOSURE OF INVENTION

Technical Problem

The purpose of the present technology is to make it possible to easily check flicker of an HFR image signal.

Solution to Problem

A concept of the present technology resides in an imaging device including: an imaging unit configured to obtain an image signal of a second frame rate higher than a first frame rate; and an image signal processing unit configured to generate a display image signal of the first frame rate by a frame thinning process from the image signal of the second frame rate. The image signal processing unit determines a frame to be thinned from a relationship between the second frame rate and a light source frequency.

In the present technology, an image signal of a second frame rate higher than a first frame rate is able to be obtained by an imaging unit. The first frame rate is, for example, a standard frame rate, such as 60 fps. On the other hand, the second frame rate is, for example, a high frame rate and is 120 fps, 180 fps, 240 fps, or the like.

display image signal of the first frame rate is generated from an image signal of the second frame rate by a frame thinning process, by an image signal processing unit. Here, a frame to be thinned is determined from a relationship between the second frame rate and a light source frequency. For example, the image signal processing unit may obtain the number of frames to be a flicker period from the second frame rate and the light source frequency, and may determine the frame to be thinned so that continuous frames of the number of frames to be the flicker period are present.

In this case, for example, the number of frames to be the flicker period may be obtained from Math. "number of frames to be flicker period=LCM (light source frequency, second frame rate)/(light source frequency)". LCM (Element 1, Element 2) indicates the least common multiple of "Element 1 and Element 2". In addition, in this case, for example, the number of frames to be the flicker period may be obtained from Math. "number of frames to be flicker period=ROUND (second frame rate)/(light source frequency)". ROUND (Element) indicates a rounded value of "Element".

In addition, for example, the image signal processing unit may determine the frame to be thinned so as to extract a frame of which a flicker phase sequentially changes, for each predetermined frame.

As described above, in the present technology, the frame to be thinned is determined from the relationship between the second frame rate and the light source frequency, and the display image signal of the first frame rate is generated from the image signal of the second frame rate by the frame thinning process. Therefore, it is possible to leave a luminance difference of flicker in each frame of the display image signal of the first frame rate, and it is possible to check the flicker in real time by the display image signal of the first frame rate.

Note that, in the present technology, for example, the image signal processing unit may have a normal process mode and a flicker check mode, and when the image signal processing unit is in the flicker check mode, the image signal processing unit may generate the display image signal of the first frame rate from the image signal of the second frame rate by the frame thinning process, and determine the frame to be thinned from the relationship between the second frame rate and the light source frequency. In this case, the display image signal of the first frame rate is able to check the flicker in real time by setting a flicker check mode.

Note that, in the normal process mode, similarly to the related art, the display image signal of the first frame rate is generated by averaging in a frame direction or thinning in the frame direction. In this case, the display image signal of the first frame rate is able to check the brightness, a white balance, or the like of a captured image in real time.

In this case, for example, a display control unit configured to display that the image signal processing unit is in the flicker check mode on a display unit that displays an image by the display image signal when the image signal processing unit is in the flicker check mode may be further included. In this case, from display on a display unit (monitor), the user is able to easily recognize that it is in a flicker check mode, that is, it is in a special monitor output mode.

In addition, in the present technology, for example, a flicker correction unit configured to perform a flicker correction process on the image signal of the second frame rate on the basis of the second frame rate and the light source frequency may be further included. The image signal processing unit may generate the display image signal of the first frame rate from the image signal of the second frame rate of which flicker is corrected. In this case, the display image signal of the first frame rate generated by an image signal processing unit is able to check flicker after flicker correction in a flicker correction unit in real time.

In this case, for example, an operation unit for operating the flicker correction process of the flicker correction unit may be further provided. Therefore, the user is able to perform a change operation of the flicker correction process in the flicker correction unit as necessary according to the flicker checked by the display image signal of the first frame rate.

In addition, another concept of the present technology resides in an imaging device including: an imaging unit configured to obtain an image signal of a second frame rate higher than a first frame rate; an image signal processing unit configured to generate a display image signal of the first frame rate from the image signal of the second frame rate; a luminance level detection unit configured to detect a luminance level of a frame of a predetermined number of continuous frames of the second frame rate; and a signal superimposing unit configured to superimpose a display signal for displaying the detected luminance level of the frame of the predetermined number of frames on the display image signal.

In the present technology, an image signal of a second frame rate higher than a first frame rate is able to be obtained by an imaging unit. The first frame rate is, for example, a standard frame rate, such as 60 fps. On the other hand, the second frame rate is, for example, a high frame rate and is 120 fps, 180 fps, 240 fps, or the like.

The display image signal of the first frame rate is generated from the image signal of the second frame rate by the image signal processing unit. In this case, for example, a process of averaging the image signal of the second frame rate in the frame direction or a process of thinning the image signal of the second frame rate in the frame direction is executed on the image signal of the second frame rate to generate the display image signal of the first frame rate.

A luminance level of a frame of a predetermined number of continuous frames of the image signal of the second frame rate is detected by a luminance level detection unit. For example, the predetermined number of frames may be the number of frames to be a flicker period obtained from the second frame rate and the light source frequency. A display signal for displaying the detected luminance level of the frame of the predetermined number of frames is superimposed on the display image signal of the first frame rate by a signal superimposing unit.

As described above, in the present technology, the display signal for displaying the luminance level detected in the frame of the predetermined number of continuous frames of the image signal of the second frame rate is superimposed on the display image signal of the first frame rate. Therefore, the luminance level detected in the frame of the predetermined number of frames is displayed on the image displayed by the display image signal as, for example, a bar, a numerical value, or the like, and it is possible to check the flicker in real time.

Another concept of the present technology resides in a server including: a recording and reproducing unit configured to record an input image signal of a second frame rate higher than a first frame rate in a storage and reproduce an output image signal from the storage; and a processing unit configured to obtain a display image signal of the first frame rate for flicker check on the basis of the input image signal of the second frame rate.

In the present technology, a recording and reproducing unit records an input image signal of a second frame rate higher than a first frame rate in a storage and reproduces an output image signal from the storage. A processing unit obtains a display image signal of the first frame rate for flicker check on the basis of the input image signal of the second frame rate.

For example, the processing unit may generate the display image signal of the first frame rate from the input image signal of the second frame rate by the frame thinning process and may determine the frame to be thinned from the relationship between the second frame rate and a light source frequency. In this case, for example, the processing unit may obtain the number of frames to be a flicker period from the second frame rate and the light source frequency, and may determine the frame to be thinned so that continuous frames of the number of frames to be the flicker period are present. In addition, in this case, for example, the processing unit may determine the frame to be thinned so as to extract a frame of which a flicker phase sequentially changes, for each predetermined frame.

In addition, for example, the processing unit may superimpose a display signal that displays a luminance level of a frame of a predetermined number of continuous frames of the image signal of the second frame rate on an image signal of the first frame rate generated from the input image signal of the second frame rate to generate the display image signal of the first frame rate. In this case, for example, the predetermined number of frames is the number of frames to be a flicker period obtained from the second frame rate and a light source frequency.

As described above, in the present technology, the display image signal of the first frame rate for flicker check is obtained on the basis of the input image signal of the second frame rate. Therefore, it is possible to easily check the flicker in the image signal of the second frame rate.

Advantageous Effects of Invention

According to the present technology, it is possible to check flicker of a captured image signal of an HFR camera in real time. Note that the effects described in the present specification are merely examples and are not intended to be limiting, and there may be additional effects.

BRIEF DESCRIPTION OF DRAWINGS

FIG. 4 is a diagram illustrating an example of a weighting coefficient set stored in a nonvolatile memory of the imaging device.

FIG. 5 is a diagram illustrating an example of a UI screen for setting a flicker correction condition displayed on a finder.

FIGS. 6A and 6B are diagrams illustrating an example of a finder display in a case of a normal process mode and a flicker check mode.

FIGS. 7A and 7B are diagrams illustrating an example of a process (frame addition method) of a finder output generation unit in a case of the normal process mode.

FIGS. 8A and 8B are diagrams illustrating an example of a process (thinning method) of the finder output generation unit in a case of the normal process mode.

FIGS. 9A and 9B are diagrams illustrating an example of a process (first method) of the finder output generation unit in the flicker check mode.

FIGS. 10A and 10B are diagrams illustrating an example of a process (second method) of the finder output generation unit in the flicker check mode.

FIGS. 11A and 11B are diagrams illustrating an example of a process (second method) of the finder output generation unit in the flicker check mode.

FIGS. 12A and 12B are diagrams illustrating an example of a process (third method) of the finder output generation unit in the flicker check mode.

FIG. 13 is a block diagram illustrating an example of a configuration of a video system according to an embodiment.

FIG. 16 is a block diagram illustrating another example of the configuration of the server.

MODE(S) FOR CARRYING OUT THE INVENTION

Hereinafter, an embodiment for implementing the present technology (hereinafter, referred to as "embodiment") will be described. Note that the description will be given in the following sequence.
1. First Embodiment
2. Second Embodiment
3. Modified example 1. First Embodiment

[Example of Configuration of Imaging Device]

Figure 1:
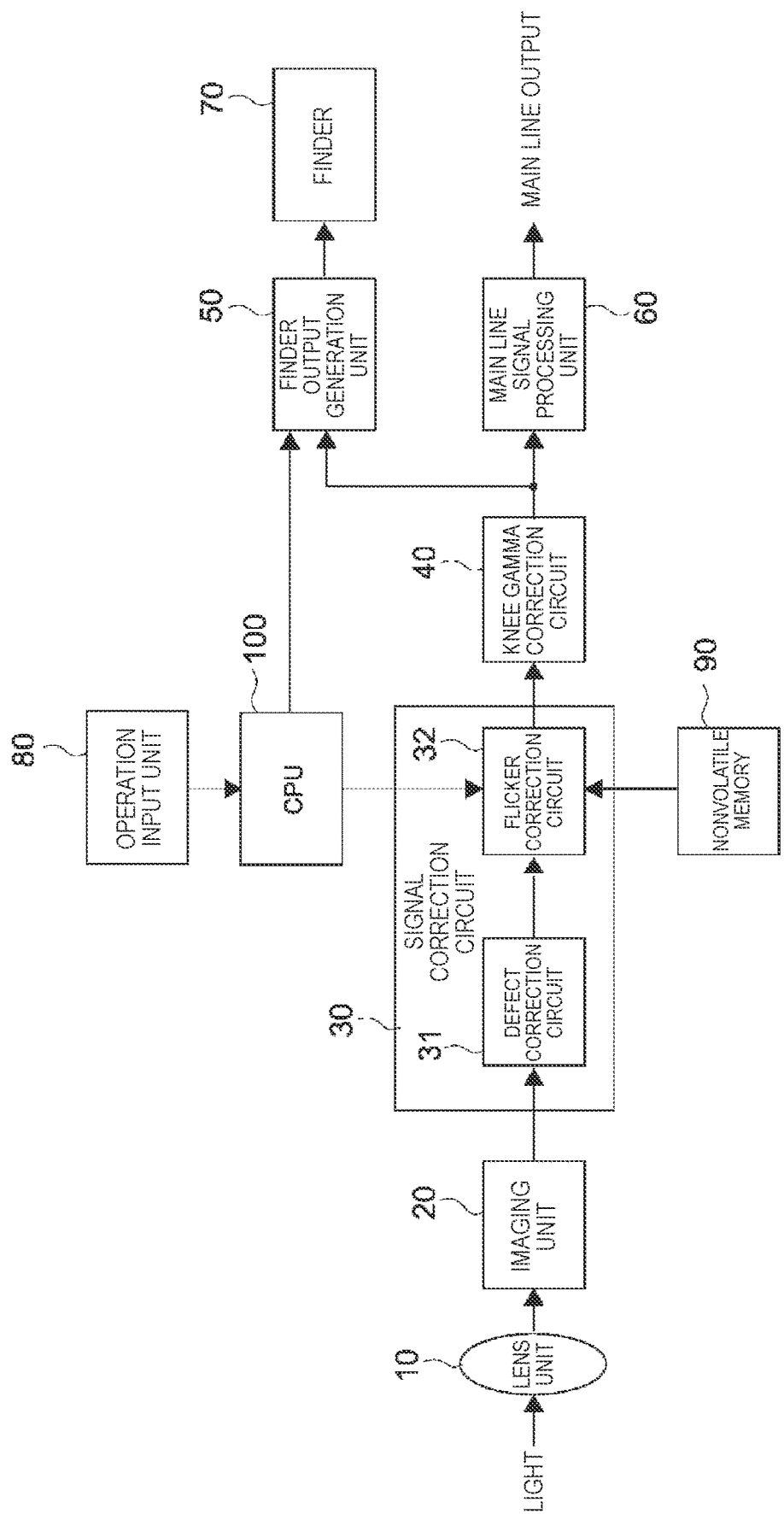
FIG. 1 is a block diagram illustrating an example of a configuration of an imaging device according to an embodiment.

FIG. 1 illustrates an example of a configuration of an imaging device 1 as a first embodiment. The imaging device 1 includes a lens unit 10, an imaging unit 20, a signal correction circuit 30, a knee gamma correction circuit 40, a finder output generation unit 50, a main line signal processing unit 60, a finder 70, an operation input unit 80, a nonvolatile memory 90, and a central processing unit (CPU) 100.

The lens unit 10 includes a combination of a photographing lens or a plurality of lenses. The lens unit 10 collects light from a subject and forms an image on an imaging surface of the imaging unit 20. The imaging unit 20 includes, for example, an image sensor such as a complementary metal oxide semiconductor (CMOS) image sensor or a charge coupled device (CCD) having an imaging surface on which pixels arranged in a matrix are provided. The imaging unit 20 receives the light of the subject incident through the lens unit 10 on the imaging surface and supplies an image signal of a high frame rate obtained by performing photoelectric conversion in pixel units to the signal correction circuit 30.

The signal correction circuit 30 performs various corrections on the image signal generated by the imaging unit 20. The signal correction circuit 30 includes a defect correction circuit 31 and a flicker correction circuit 32 (luminance correction circuit). The defect correction circuit 31 detects an image signal corresponding to a position of a defective pixel in the imaging unit 20 and corrects the image signal. The flicker correction circuit 32 removes flicker generated in the image signal due to a difference between a power supply frequency and a frame rate. The signal correction circuit 30 supplies the corrected image signal to the knee gamma correction circuit 40.

The knee gamma correction circuit 40 performs knee correction and gamma correction on the image signal supplied from the signal correction circuit 30 and supplies a result to the finder output generation unit 50 and the main line signal processing unit 60.

The finder output generation unit 50 converts the image signal of the high frame rate supplied from the knee gamma correction circuit 40 into an image signal for finder display at a standard frame rate, for example, 60 fps, and supplies the image signal for finder display to the finder 70. In this embodiment, the finder output generation unit 50 includes a normal process mode and a flicker check mode. Switching between the two modes is controlled by the CPU 100, for example, in response to an operation from an operation input unit 80 of a user. Details of a process in the finder output generation unit 50 will be described later.

In addition, the finder output generation unit 50 generates display data of a graphical user interface (GUI) for receiving an input of various kinds of information from the user using the operation input unit 80, performs superimposition of the display data on a display image signal, or the like, and outputs the display data to the finder 70. The finder 70 performs display of an image by the image signal obtained by the finder output generation unit 50, display of the GUI by the display data obtained by the finder output generation unit 50, and the like.

The main line signal processing unit 60 performs a process such as compression coding and error correction coding on the image signal of the high frame rate supplied from the knee gamma correction circuit 40, and stores the processed image signal in a storage that is not shown or transmits the processed image signal to an external device through a transmission cable.

For example, the operation input unit 80 receives input of setting information such as various photographing conditions from the user. The nonvolatile memory 90 is, for example, a memory storing a plurality of sets of weighting coefficients used in the flicker correction circuit 32. The CPU 100 is a control circuit that performs overall control of the imaging device 1.

"Details of flicker correction circuit"

Figure 2:
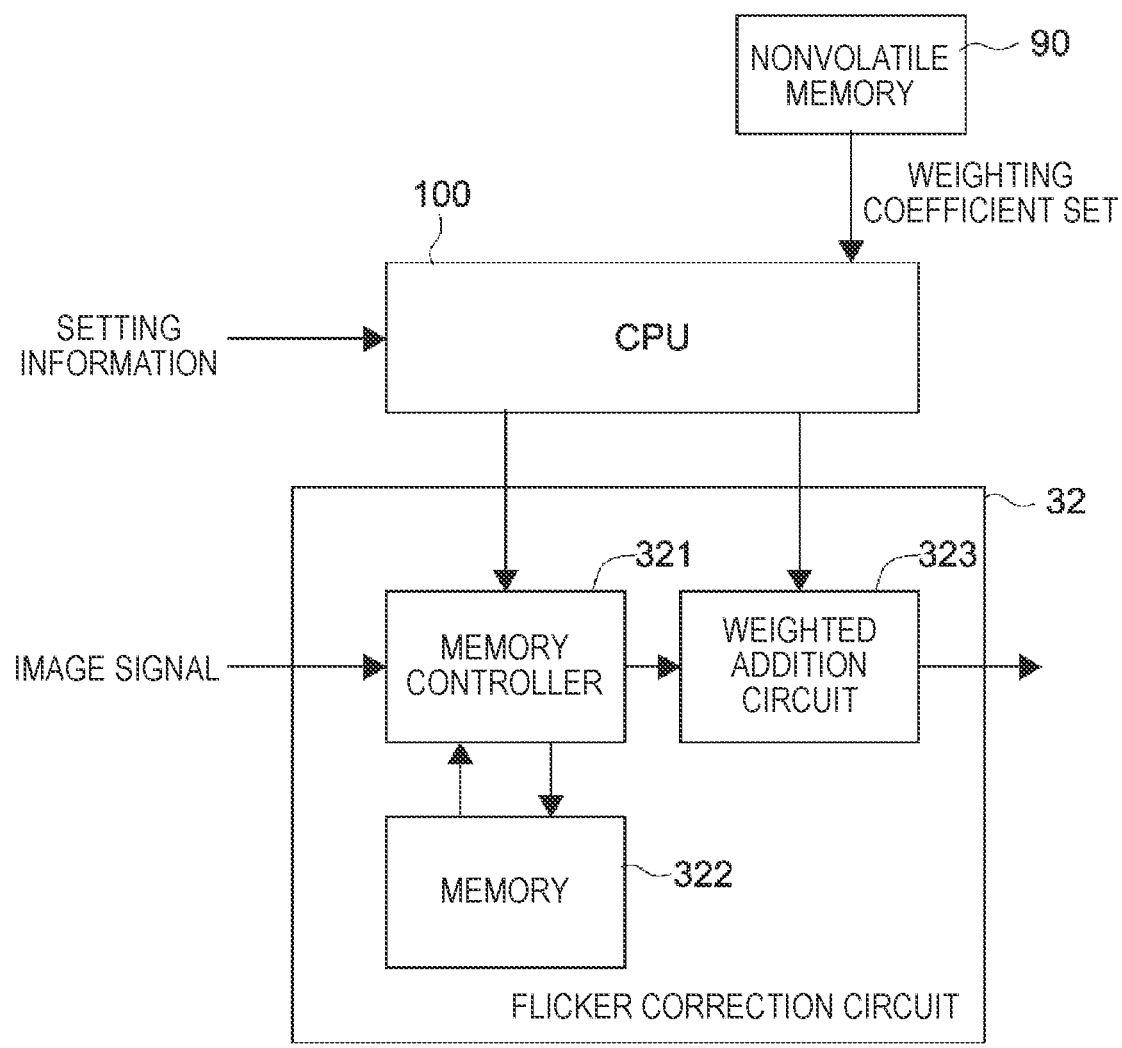
FIG. 2 is a block diagram illustrating an example of a configuration of a flicker correction circuit in a signal correction circuit.

FIG. 2 illustrates an example of a configuration of the flicker correction circuit 32 in the signal correction circuit 30. The flicker correction circuit 32 includes a memory controller 321, a memory 322, and a weighted addition circuit 323, and performs weighted addition type flicker correction. Note that the weighted addition type flicker correction method described here is an example, and the flicker correction circuit 32 may perform flicker correction by a general flicker correction method.

The flicker correction circuit 32 performs the flicker correction on the image signal on the basis of the flicker correction condition given from the CPU 100. For example, the CPU 100 sets various correction conditions and the like of the signal correction circuit 30 according to various types of setting information input by the user using the operation input unit 80 provided in the imaging device 1. The user is able to input the setting information associated with the flicker correction. The setting information associated with the flicker correction includes a power supply frequency, a frame rate, and an accumulation type (hereinafter, referred to as "ACM type") that specifies a flicker correction mode.

Here, the setting information associated with the flicker correction will be described. For example, the power supply frequency has options of 50 Hz, 60 Hz, and the like. It is sufficient if the user selects a setting value of the power supply frequency according to a commercial power supply frequency supplied to a region where the imaging device 1 is used.

For example, the frame rate has options of 120 fps, 180 fps, 240 fps, 480 fps, and the like. In a case in which the frame rate is twice the power supply frequency, that is, lower than a light emission frequency of a fluorescent lamp, it is possible to remove flicker by driving a shutter at the light emission frequency of the fluorescent lamp. However, in a case in which the frame rate is higher than twice the power supply frequency (light emission frequency of the fluorescent lamp), it is impossible to remove the flicker by the shutter. Therefore, it is necessary to perform the flicker correction through a signal process by the flicker correction circuit 32.

The ACM type is information for designating a set of weighting coefficients to be given to each of M frames on which weighted addition is to be performed for the flicker correction by the weighted addition circuit 323. The CPU 100 determines the set of weighting coefficients on the basis of the setting information input by the user by operating the operation input unit 80 and sets each of the weighting coefficients in the weighted addition circuit 323.

In addition, the CPU 100 also sets the number of frames stored in the memory 322 in the memory controller 321 on the basis of the setting information input by the user by operating the operation input unit 80. Under the control of the CPU 100, the memory controller 321 stores the image signal that is corrected by a correction circuit of a preceding stage in the signal correction circuit 30 in the memory 322, reads the image signal of M frames from the memory 322 when the image signal of the set M frames are stored in the memory 322, and supplies the image signal to the weighted addition circuit 323.

The memory 322 is a storage region where the image signal of at least M frames, which is corrected by the correction circuit in the preceding stage in the signal correction circuit 30 is stored. The memory 322 always stores a newly input image signal of at least M frames. The number of frames stored in the memory 322 may be greater than M.

The weighted addition circuit 323 is a circuit that inputs the image signal of the M frames that are supplied continuously by reading the image signal of the M frames from the memory 322 by the memory controller 321, executes a weighted addition and averaging on the image signal of the M frames using the weighting coefficients set by the CPU 100, and generates a flicker correction image by the weighted addition type flicker correction. Here, a value of M is an integer of 2 or more that is set with an integer obtained by rounding a value obtained by dividing the frame rate by a light source frequency (power source frequency×2) as an upper limit.

The weighted addition type flicker correction multiplies the image signal of the continuous M frames on which the weighted addition is to be performed by the weighting coefficients individually set for the frames of each rank in the M frames, and sets a result obtained by performing addition averaging on a result of the multiplication as a flicker correction result for an image signal of a reference frame in the M frames. Here, the reference frame is, for example, a frame of a predetermined rank among the M frames that are continuously supplied to the flicker correction circuit 32, for example, the last supplied frame or the like. In a case in which the last supplied frame is used as the reference frame, the M continuous frames on which the weighted addition is to be performed are the reference frame and (M−1) frames that are continuously supplied to the flicker correction circuit 32 temporally before the reference frame.

Figure 3:
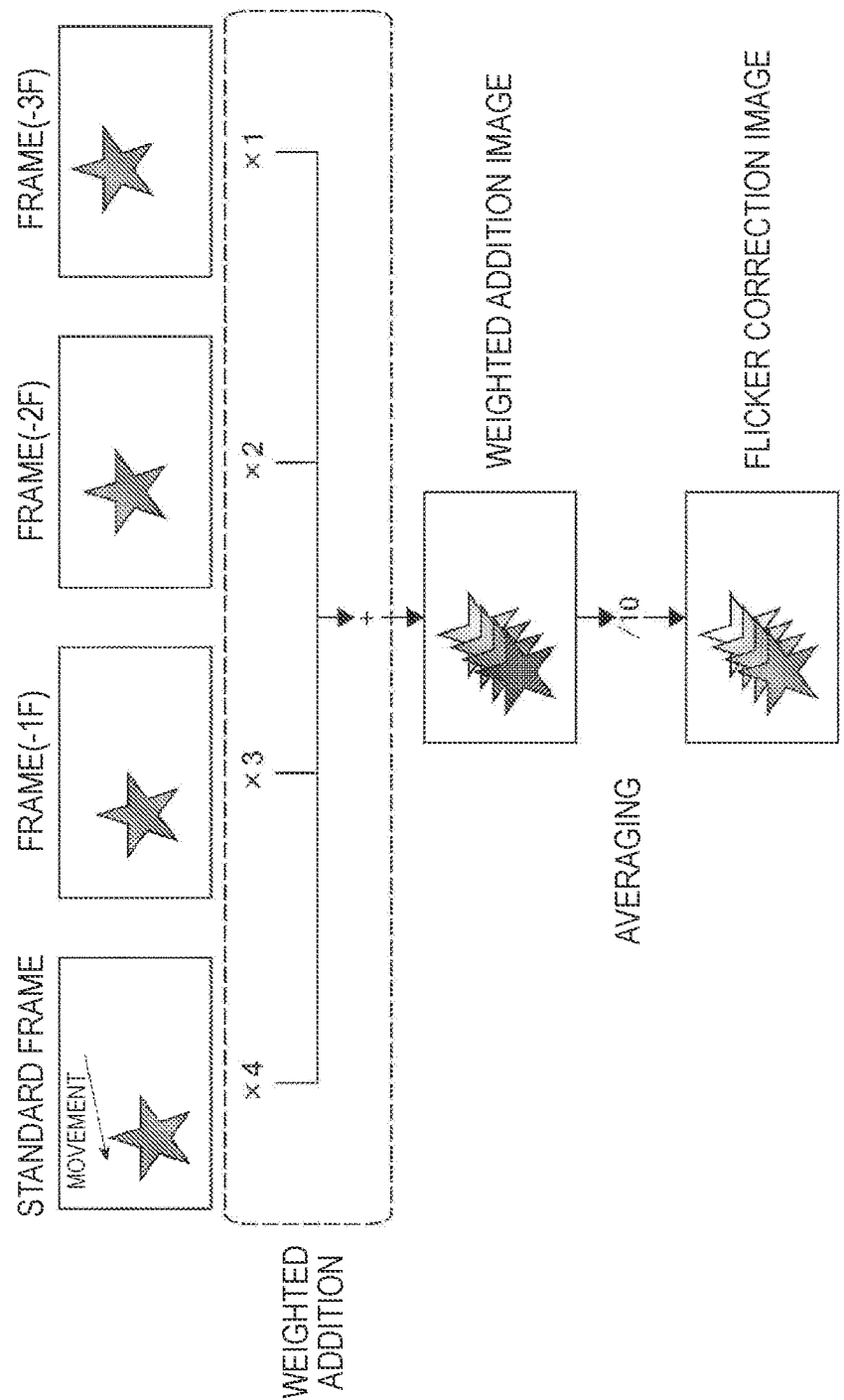
FIG. 3 is a diagram illustrating a specific example of weighted addition type flicker correction.

FIG. 3 illustrates a specific example of the weighted addition type flicker correction. In this example, a value of M indicating the number of frames on which the weighted addition is to be performed is 4, a value of the weighting coefficients individually set in the frames of each rank in the M continuous frames in advance is "4", "3", "2", and "1" from a side of the reference frame side. The values of the weighting coefficients may be manually input by the user using the operation input unit 80 in advance or may be stored in the nonvolatile memory 90 in advance. Note that, as described above, a group of values of a plurality of weighting coefficients associated with frames of each rank in the M continuous frames is hereinafter referred to as "weighting coefficient set".

Under the above conditions, the weighted addition circuit 323 operates as follows. First, the weighted addition circuit 323 multiplies the image signal of the reference frame by the weighting coefficient "4" to generate a weighted image signal of the reference frame. In addition, the weighted addition circuit 323 multiplies an image signal of a frame (−1F) that is input immediately before the reference frame by the weighting coefficient "3" to generate a weighted image signal of the frame (−1F).

In addition, the weighted addition circuit 323 multiplies an image signal of a frame (−2F) that is input immediately before the frame (−1F) by the weighting coefficient "2" to generate a weighted image signal of the frame (−2F). In addition, the weighted addition circuit 323 multiplies an image signal of a frame (−3F) that is input immediately before the frame (−2F) by the weighting coefficient "1" to generate a weighted image signal of the frame (−3F).

Next, the weighted addition circuit 323 adds values for each corresponding pixel (at the same position) to the weighted image signal of the reference frame, the weighted image signal of the frame (−1F), the weighted image signal of the frame (−2F), and the weighted image signal of the frame (−3F), to generate a weighted addition image signal for the M frames. In addition, the weighted addition circuit 323 divides the weighted addition image signal for the M frames by a sum of the weighting coefficients in the weighting coefficient set. This result is a flicker correction image for the image signal of the reference frame.

It is possible to prevent blurring of the entire moving image in the flicker correction image from becoming a uniform tendency, and it is possible to obtain motion blur with more natural appearance, by performing such weighted addition type flicker correction. In addition, as a distance from the moving image of the reference frame increases, a degree of blurring increases and it is possible to obtain motion blur with more natural appearance by maximizing the value of the weighting coefficient set for the reference frame among the values of the weighting coefficients individually set for the frames of each rank in the M frames.

A difference in the values of each weighting coefficient in the weighting coefficient set also causes flicker component to remain in the flicker correction image. On the other hand, the appearance of the motion blur changes depending on various conditions such as size, color, and speed of the moving image. Therefore, in a case in which attention is paid only to the appearance of the motion blur and the values of each weighting coefficient in the weighting coefficient set are selected, in some cases, conspicuous flicker may remain in the flicker correction image.

Therefore, in this embodiment, the user is able to select the best weighting coefficient set from a viewpoint of the motion blur and a flicker removal effect. FIG. 4 illustrates an example of the weighting coefficient set stored in the nonvolatile memory 90 of the imaging device 1. In this example, the weighting coefficient set is able to be selected by three kinds of ACM types from "1" to "3". In the example of FIG. 4, a frame having of which a value of the weighting coefficient value is "0" does not have a weighted addition target as a result by multiplying the image signal by "0".

In FIG. 4, it is assumed that a total of three kinds of weighting coefficient sets are able to be selected by the ACM type from "1" to "3" for one combination of the power supply frequency and the frame rate, but more kinds of weighting coefficient sets may be prepared. Note that the values of each weighting coefficient in the weighting coefficient set are determined for each combination of the power source frequency and the frame rate.

In individual weighting coefficient set, it is assumed that the value of the weighting coefficient assigned to the reference frame is set as the maximum value. The value of the weighting coefficient of the (M−1) frames other than the reference frame is determined such that a value of a weighting coefficient of a frame temporally separated from the reference frame is not greater than a value of a weighting coefficient of a frame temporally closer to the reference frame compared to the frame thereof.

In other words, for a plurality of frames having different distances from the frame of the predetermined rank in the (M−1) frames other than the frame of the predetermined rank, the value of the weighting coefficient set for the frame of which a distance is relatively long is set to be equal to or less than the value of the weighting coefficient set for the frame of which a distance is relatively short. Therefore, it is possible to suppress a degree of influence on the flicker correction image by a moving image component in the frame which is further temporarily distant from the reference frame, and it is possible to obtain motion blur with more natural appearance.

In addition, in a plurality of kinds of weighting coefficient sets selected by the ACM type, the weighting coefficient set of which the ACM type is "1" has the highest intensity of the flicker correction, and therefore the intensity that affects the appearance of the motion blur is the highest. The value of the weighting coefficient in the weighting coefficient set is set so that the intensity gradually decreases as the ACM type becomes "2" and "3". Note that one of the weighting coefficient sets selected by the ACM type may have the same value of the weighting coefficient.

FIG. 5 illustrates an example of a UI screen for setting a flicker correction condition displayed on, for example, the finder 70. This example shows a case in which the power supply frequency=50 Hz, the frame rate=120 fps, and the ACM type=1 are set as the flicker correction condition.

The power frequency, the frame rate, and the ACM type selected by the user using the operation input unit 80 are given to the CPU 100. The CPU 100 refers to the weighting coefficient set corresponding to the combination of the power supply frequency, the frame rate, and the ACM type given from the nonvolatile memory 90, and sets the values of the weighting coefficients for each frame of each rank in the weighting coefficient set to the weighted addition circuit 323. Therefore, the weighted addition circuit 323 performs the flicker correction using the weighted addition by the set value of the weighting coefficient on the image signal of the input continuous M frames.

The user checks the appearance of the motion blur in the flicker correction image and the flicker removal effect obtained under the flicker correction condition set by the user with an image or the like displayed on the finder 70 by causing the finder output generation unit 50 to be a flicker check mode. Thereafter, as necessary, the user operates the operation input unit 80 or the like to set a next flicker correction condition in which only the ACM type is changed, so as to check the flicker correction image obtained by executing the flicker correction under the flicker correction condition.

The user repeats the change of the ACM type and the check of the flicker correction image as described above, and determines the ACM type in which the appearance of the motion blur and the degree of the removal of the flicker component are the best. In many operation environments of the imaging device 1, while the power supply frequency and the frame rate are determined, the user switches only the ACM type, checks the flicker correction image each time, and determines the best ACM type.

In the plurality of kinds of weighting coefficient sets selected by the ACM type, the value of the weighting coefficient in the weighting coefficient set is set so that the weighting coefficient set of which the ACM type is "1" has the highest intensity that affects the appearance of the motion blur and the intensity gradually decreases as the ACM type becomes "2" and "3".

The user is first able to check the flicker correction image in which the appearance of the motion blur has largely changed by selecting the weighting coefficient set of the ACM type "1", and thereafter, the user is able to check the flicker correction image by sequentially selecting the ACM type of "2" and "3". Therefore, the user is able to sequentially check the flicker correction image in which the change in the appearance of the motion blur is reduced step by step, and confusion when determining an optimum weighting coefficient set hardly occurs.

Note that, here, in the order of ACM types of "1", "2", and "3", the value of the weighting coefficient in the weighting coefficient set is set so that the intensity of the weighting coefficient set that affects the appearance of the motion blur becomes weaker. However, conversely, in order of the ACM types of "1", "2", and "3", the value of the weighting coefficient in the weighting coefficient set may be set so that the intensity of the weighting coefficient set that affects the appearance of the motion blur becomes stronger.

"Description of Finder Output Generation Unit"

As described above, the finder output generation unit 50 includes the normal process mode and the flicker check mode. The switching between these two modes is controlled by the CPU 100, for example, in response to the operation from the operation input unit 80 of the user.

For example, when the finder output generation unit 50 is in the flicker check mode, display data for displaying that the finder output generation unit 50 is in the flicker check mode on the finder 70 is created, and superimposes the display data on the image signal. Therefore, in the image displayed on the finder 70, displaying that the finder output generation unit 50 is in the flicker check mode is present, and the user is easily able to check that the finder output generation unit 50 is in the flicker check mode.

For example, when FIG. 6B is a finder display image of the normal process mode, when the finder output generation unit 50 is in the flicker check mode, as shown in FIG. 6A, a character "FC" indicating flicker is blinkingly displayed on a finder display image. Note that, the display for clearly indicating that the finder output generation unit 50 is in the flicker check mode to the user is not limited to this example, and other aspects may be used. For example, a frame of a specific color may be added to the finder display image.

The normal process mode will be described. When the finder output generation unit 50 is set to be in the normal process mode, the finder output generation unit 50 generates the image signal of the standard frame rate for finder display by performing a conventionally well-known frame addition method or thinning method on the input image signal of the high frame rate.

FIGS. 7A and 7B illustrate an example of a process by the frame addition method. This example shows a case in which the frame rate of the input image signal is 180 fps and the power supply frequency is 60 Hz (the light source frequency is 120 Hz).

FIG. 7A illustrate the main line image signal corresponding to the input image signal. The main line image signal is the image signal of the high frame rate of 180 fps, and the image signals of each frame are continuous such as A1, A2, A3, B1, B2, B3, C1, C2, C3, and . . . .

Flicker is present in the image signal of the high frame rate of 180 fps due to an influence of the light source by the light source frequency of 120 Hz. Numbers of 1, 2, and 3 attached to A, B, C, and . . . correspond to three phases of the flicker. Note that brightness on the drawing of each frame indicates a difference in luminance level of each frame due to the flicker.

FIG. 7B illustrate an image signal of the standard frame rate (60 fps) for the finder display obtained by the frame addition method. In this case, addition-averaging is performed in each of three frames of "A1, A2, and A3", "B1, B2, and B3", "C1, C2, and C3", and . . . , and the image signal for finder display of each frame is generated.

In the image signal for finder display obtained by the frame addition method as described above, since the luminance difference of each frame due to the flicker is lost by the addition, a finder display image is not able to express the flicker included in the main image signal. Conversely, it is possible to display an image in which the influence of the flicker is suppressed.

FIGS. 8A and 8B illustrate an example of a process by the thinning method. Similarly to the example of FIGS. 7A and 7B, this example also shows a case in which the frame rate of the input image signal is 180 fps and the power supply frequency is 60 Hz (the light source frequency is 120 Hz).

Similar to FIG. 7A, FIG. 8A illustrates the main line image signal corresponding to the input image signal. FIG. 8B illustrates the image signal of the standard frame rate (60 fps) for the finder display obtained by the thinning method. In this case, from the three frames of each of "A1, A2, and A3", "B1, B2, and B3", "C1, C2, and C3", and . . . , frames having the same flicker phase, in this example A2, B2, C2, and . . . are extracted, and each frame of the image signal for finder display is generated.

In the image signal for finder display obtained by the thinning method as described above, since frames having the same flicker phase are extracted, a finder display image is not able to express the flicker included in the main image signal. Conversely, it is possible to display an image in which the influence of the flicker is suppressed.

Next, the flicker check mode will be described. When the finder output generation unit 50 is set to be in the flicker check mode, the finder output generation unit 50 generates the image signal of the standard frame rate for the finder display by performing any of the following first to third methods on the input image signal of the high frame rate so that it is possible to express the flicker included in the main line image signal.

"First Method"

In the first method, basically, the finder output generation unit 50 performs a frame thinning process on the input image signal of the high frame rate (second frame rate) to generate the image signal of the standard frame rate (first frame rate) for the finder display. Here, the frame to be thinned is determined from the relationship between the frame rate of the input image signal and the light source frequency that is twice the power supply frequency.

In the first method, the number of frames to be a flicker period is obtained from the frame rate of the input image signal and the light source frequency that is twice the power supply frequency, and the frame to be thinned is determined so that the continuous frames of the number of frames to be the flicker period are present.

Here, the number of frames to be the flicker period is able to be obtained from the following Math. (1). Here, LCM (Element 1, Element 2) indicates the least common multiple of "Element 1 and Element 2".

$$\text{Number of frames to be flicker period} = LCM(\text{light source frequency, frame rate of input image signal})/(\text{light source frequency}) \quad (1)$$

FIGS. 9A and 9B illustrate an example of a process by the first method. This example shows a case in which the frame rate of the input image signal is 120 fps and the power supply frequency is 50 Hz (the light source frequency is 100 Hz). In this case, the flicker is present due to the influence of the light source by the light source frequency of 120 Hz in the input image signal of 120 fps, and the number of frames to be the flicker period is obtained as 6 from the above-described Math. (1).

FIG. 9A illustrates the main line image signal corresponding to the input image signal. The main line image signal is the image signal of the high frame rate of 120 fps, and the image signals of each frame are continuous such as A1, A2, A3, A4, A5, A6, B1, B2, B3, B4, B5, B6, C1, C2, C3, C4, C5, C6, and . . . . Numbers of 1, 2, 3, 4, 5, and 6 attached to A, B, C, and . . . correspond to six phases of the flicker. Note that the brightness on the drawing of each frame indicates the difference in luminance level of each frame due to the flicker.

FIG. 9B illustrates the image signal of the standard frame rate (60 fps) for finder display obtained by the process according to the first method. In this case, each of frames of A1 to A6, which is the number of frames to be the flicker period, is stored in the memory, and each of frames is sequentially read from the memory at the standard frame rate (60 fps) and is output.

The frames (frames B1 to B6) during the read from the memory as described above are not stored in the memory and are thinned. Thereafter, each of frames of C1 to C6, which is the number of frames to be the next flicker period, is stored in the memory, and each of frames is sequentially read from the memory at the standard frame rate (60 fps) and is output. Hereinafter, this is repeated, and each frame of the image signal for finder display is generated.

As described above, the image signal for finder display obtained by the first method includes the frames which are continuous in phase of the flicker. Therefore, the flicker included in the main line image signal is expressed in the finder display image, and the degree of the flicker included in the main line image signal is able to be checked in real time.

Note that it is theoretically possible to accurately obtain the number of frames to be the flicker period from Math. (1). However, depending on the relationship between the frame rate of the input image signal and the light source frequency, since the number of frames to be the flicker period may become very large, a case in which it is not realistic from a viewpoint of a necessary memory capacity also may occur. For example, there are a case in which the frame rate of the input image signal is 59.94 fps and the power supply frequency is 50 Hz (the light source frequency is 100 Hz), and the like.

In such a case, the number of frames to be the flicker period may be obtained from the following Math. (2). Here, ROUND (Element) indicates a value obtained by rounding "Element".

$$\text{Number of frames to be flicker period} = \text{ROUND}(\text{frame rate of input image signal/light source frequency}) \quad (2)$$

For example, in a case in which the frame rate of the input image signal is 239.76 fps (=4×59.94 fps) and the power supply frequency is 60 Hz (the light source frequency is 120 Hz), the number of frames to be the flicker period is 2 by Math. (2). Even though the number of frames to be the flicker period is obtained by using the Math. (2) instead of Math. (1), there are no practical problems in many cases.

"Second Method"

In the second method, basically, the finder output generation unit 50 performs a frame thinning process on the input image signal of the high frame rate (second frame rate) to generate the image signal of the standard frame rate (first frame rate) for the finder display. Here, the frame to be thinned is determined from the relationship between the frame rate of the input image signal and the light source frequency that is twice the power supply frequency.

In the second method, when the frame rate of the input image signal is N times the standard frame rate for finder display, the frame to be thinned is determined such that frames having different flicker phases are extracted for each of N frames.

FIGS. 10A and 10B illustrate an example of a process by the second method. This example shows a case in which the frame rate of the input image signal is 180 fps and the power supply frequency is 60 Hz (the light source frequency is 120 Hz). In this case, when the frame rate of the input image signal is 180 fps and the standard frame rate is 60 fps, N=3. Furthermore, in this case, the number of frames to be the flicker period obtained by the above-described Math. (1) is 3, which is equal to the value of N.

FIG. 10A illustrates the main line image signal corresponding to the input image signal. The main line image signal is the image signal of the high frame rate of 180 fps, and the image signals of each frame are continuous such as A1, A2, A3, B1, B2, B3, C1, C2, C3, D1, D2, D3 . . . and so on, wherein numbers of 1, 2, and 3 attached to A, B, C, D . . . and so on correspond to three phases of the flicker. Note that the brightness on the drawing of each frame indicates the difference in luminance level of each frame due to the flicker.

FIG. 10B illustrates the image signal of the standard frame rate (60 fps) for finder display obtained by the process according to the second method. In this case, from the three frames of "A1, A2, and A3", "B1, B2, and B3", "C1, C2, and C3", and . . . , frames in which the flicker phase sequentially changes, in this example, A3, B1, and C2, . . . are extracted, and each frame of the image signal for finder display is generated.

As described above, the image signal for finder display obtained by the second method includes the frames which are continuous in phase of the flicker. Therefore, the flicker included in the main line image signal is expressed in the finder display image, and the degree of the flicker included in the main line image signal is able to be checked in real time.

Note that the existing high-speed imaging device has a mechanism that once stores a captured image signal of a high frame rate in a memory and outputs frames of a double speed number in parallel. Only in a case in which the number of frames to be the flicker period is the same as the parallel number or less than the parallel number by one, it is possible to realize the process of the second method by selecting the frame from the parallel output.

FIGS. 11A and 11B illustrates another example of a process by the second method. This example shows a case in which the frame rate of the input image signal is 120 fps and the power supply frequency is 50 Hz (the light source frequency is 100 Hz). In this case, when the frame rate of the input image signal is 120 fps and the standard frame rate is 60 fps, N=2. Furthermore, in this case, the number of frames to be the flicker period obtained by the above-described Math (1) is 6, which is not equal to the value of N.

FIG. 11A illustrates the main line image signal corresponding to the input image signal. The main line image signal is the image signal of the high frame rate of 120 fps, and the image signals of each frame are continuous such as A1, A2, A3, A4, A5, A6, B1, B2, B3, B4, B5, B6, C1, C2, C3, C4, C5, C6 . . . and so on. Numbers of 1, 2, 3, 4, 5, and 6 attached to A, B, C . . . and so on correspond to six phases of the flicker. Note that the brightness on the drawing of each frame indicates the difference in luminance level of each frame due to the flicker.

FIG. 11B illustrates the image signal of the standard frame rate (60 fps) for finder display obtained by the process according to the second method. In this case, from the two frames of "A1 and A2", "A3 and A4", "A5 and A6", "B1 and B2" . . . and so on, frames in which the flicker phase sequentially changes, in this example, A1, A3, A5, B2 . . . and so on are extracted, and each frame of the image signal for finder display is generated.

As described above, the image signal for finder display obtained by the second method includes the frames in which the phase of the flicker sequentially changes. In this case, since the number of frames to be the flicker period is not equal to the value of N, the image signal for finder display does not include the frames which are continuous in phase of the flicker.

Therefore, in the finder display image, an approximate flicker included in the main line image signal is expressed, and thus it is possible to check an approximate degree of the flicker included in the main line image signal in real time. That is, although it is not possible to correctly grasp the degree of the flicker included in the main line image signal, it is useful for comparatively grasping a degree of effectiveness of the flicker correction.

"Third Method"

In the third method, the finder output generation unit 50 generates the image signal of the standard frame rate (first frame rate) for finder display by performing a conventionally well-known frame addition method or thinning method from the input image signal of the high frame rate (second frame rate).

In addition, the finder output generation unit 50 detects the luminance level of a predetermined number of continuous frames of the input image signal and superimposes a display signal indicating the luminance detection level of the frame of the predetermined number of frames on the image signal for finder display. For example, the predetermined number of frames is, for example, the number of frames to be the flicker period obtained by the above-described Math. (1) or (2).

Therefore, the luminance level detected in the frame of the predetermined number of continuous frames is displayed on the image by the image signal for finder display, for example, as a bar, a numerical value, or the like, and the user is able to check the degree of the flicker included in the main line image signal in real time.

FIGS. 12A and 12B illustrates an example of a process by the third method. This example shows a case in which the frame rate of the input image signal is 180 fps and the power supply frequency is 60 Hz (the light source frequency is 120 Hz). The number of frames to be the flicker period obtained by the above-described Math (1) is 3.

FIG. 12A illustrates the main line image signal corresponding to the input image signal. The main line image signal is the image signal of the high frame rate of 180 fps, and the image signals of each frame are continuous such as A1, A2, A3, B1, B2, B3, C1, C2, C3, D1, D2, D3 . . . wherein numbers of 1, 2, and 3 attached to A, B, C, D . . . correspond to three phases of the flicker. Note that the brightness on the drawing of each frame indicates the difference in luminance level of each frame due to the flicker.

FIG. 12B illustrates the image signal of the standard frame rate (60 fps) for finder display obtained by the process according to the third method. In this case, in each of three frames of "A1, A2, and A3", "B1, B2, and B3", "C1, C2, and C3", and so on, addition or thinning is performed by a conventionally well-known frame addition method or thinning method, and each frame of the image signal for finder display is generated.

In addition, in each of the three frames, an integration value of all pixels is obtained as a value of the luminance level of each frame, and a display signal indicating the detection level is superimposed on the image signal for finder display. Note that, in the shown example, the value of the luminance level of each frame is bar-displayed, but the value of the luminance level of each frame may be shown by a numerical value or the like.

As described above, in the third method, the display signal indicating the luminance detection level of the frame of the number of the predetermined continuous frames, for example, the number of frames to be the flicker period is superimposed on the image signal of the standard frame rate (first frame rate) for finder display generated by the conventionally well-known frame addition method or thinning method. Therefore, the luminance level detected in the frame of the predetermined number of frames is displayed on the image by the image signal for finder display as, for example, a bar, a numerical value, or the like. The user is able to check the degree of the flicker included in the main line image signal in real time while checking the conventional brightness, white balance, or the like in real time by the display image.

As described above, in the imaging device 1 shown in FIG. 1, it is possible to check the degree of the flicker included in the main line image signal in real time by the display image of the finder 70 by setting the finder output generation unit 50 to be in the flicker check mode. Therefore, it is possible to check the effect of the flicker correction by the flicker correction circuit 32, and as necessary, the user is able to easily and appropriately adjust a flicker correction intensity by changing the ACM type or the like from the operation input unit 80.

2. Second Embodiment

[Example of Configuration of Video System]

FIG. 13 illustrates an example of a configuration of a video system 500 as a second embodiment. The video system 500 has a predetermined number of camera systems including a camera and a camera control unit (CCU). In this embodiment, the video system 500 has two camera systems of a camera system including a camera 501A and a CCU 502A and a camera system including a camera 501B and a CCU 502B. The CCUs 502A and 502B perform an image creation process on a captured image signal of a high frame rate from the cameras 501A and 501B.

In addition, the video system 500 has a server 521 that performs recording and reproducing of an image file for replay reproduction and the like. The file recorded in the server 521 also includes a file of image signals 503A and 503B of the high frame rate output from the CCUs 502A and 502B. The image signals 503A and 503B of the high frame rate output from the CCUs 502A and 502B are transmitted as an SDI signal to the server 521 through a switcher 525 that will be described later.

In this embodiment, the server 521 generates a display signal of a standard frame rate for flicker check on the basis of the image signal 503 (503A and 503B) of the high frame rate. Here, similarly to the finder output generation unit 50 in the above-described first embodiment, the server 521 generates the display signal for the flicker check by the "first method", the "second method", or the "third method".

In the first method, the frame thinning process is performed on the image signal of the high frame rate (second frame rate) to generate the display image signal of the standard frame rate (first frame rate). Here, the frame to be thinned is determined from the relationship between the frame rate of the input image signal and the light source frequency that is twice the power supply frequency. That is, in this first method, the number of frames to be the flicker period is obtained from the frame rate of the image signal of the high frame rate (second frame rate) of the input image signal and the light source frequency that is twice the power frequency, and the frame to be thinned is determined such that the continuous frames of the number of frames to be the corresponding flicker period are present (refer to FIGS. 9A and 9B).

The display image signal of the standard frame rate for checking the flicker obtained by the first method includes the frames which are continuous in phase of the flicker. Therefore, the flicker included in the image signal of the high frame rate is expressed in the display image, and it becomes possible to easily check the degree of the flicker.

In addition, in the second method, the frame thinning process is performed on the image signal of the high frame rate (second frame rate) to generate the display image signal of the standard frame rate (first frame rate). Here, the frame to be thinned is determined from the relationship between the frame rate of the input image signal and the light source frequency that is twice the power supply frequency. That is, in this second method, when the frame rate of the input image signal is N times the standard frame rate, the frame to be thinned is determined such that frames having different flicker phases are extracted for each of N frames (see FIGS. 10A, 10B, 11A and 11B).

The display image signal of the standard frame rate for checking the flicker obtained by the second method includes the frames of which a flicker phase sequentially changes. Therefore, the flicker included in the image signal of the high frame rate is expressed in the display image, and it becomes possible to easily check the degree of the flicker.

In addition, in the third method, the image signal of the standard frame rate (first frame rate) is generated from the image signal of the high frame rate (second frame rate) by a well-known frame addition method or thinning method. In addition, the luminance level of the predetermined number of continuous frames of the image signal of the high frame rate is detected and the display signal indicating the luminance detection level of the frame of the predetermined number of frames is superimposed on the image signal of the standard frame rate described above, so as to generate the display image signal of the standard frame rate (refer to FIGS. 12A and 12B). For example, the predetermined number of frames is the number of frames to be the flicker period obtained from the second frame rate and the light source frequency.

The display image signal of the standard frame rate for checking the flicker obtained by the third method is obtained by superimposing the display signal indicating the luminance detection level of the frame of the predetermined number of frames. Therefore, the luminance level detected in the frame of the predetermined number of the continuous frames is displayed on the display image as, for example, a bar, a numerical value or the like, and the user is able to easily check the degree of the flicker included in the image signal of the high frame rate.

In addition, the video system 500 has a monitor 523 that receives the display image signal of the standard frame rate for the flicker check as the SDI signal and presents the display image for the flicker check to an operator of the server 521. Note that the monitor 523 may not only present the display image for the flicker check but also may serve as a monitor for appropriately checking the image in the file recorded in the storage.

In addition, the video system 500 has the switcher 525. The image signals 503A and 503B of the high frame rate obtained by the CCUs 502A and 502B are input as the SDI signal to the switcher 525. In addition, an image signal 524 of a high frame rate 524 reproduced by the server 521 is also input to the switcher 525 as the SDI signal.

The switcher 525 selectively extracts a predetermined image signal from an image signal of a high frame rate input from a plurality of input apparatuses such as a camera system and the server 521 and outputs the predetermined image signal as a main line signal 526 or mixes random image signals among the image signals of the high frame rate input from the plurality of input apparatuses and outputs the mixed random image signals as the main line signal 526.

"Configuration of Server"

Figure 14:
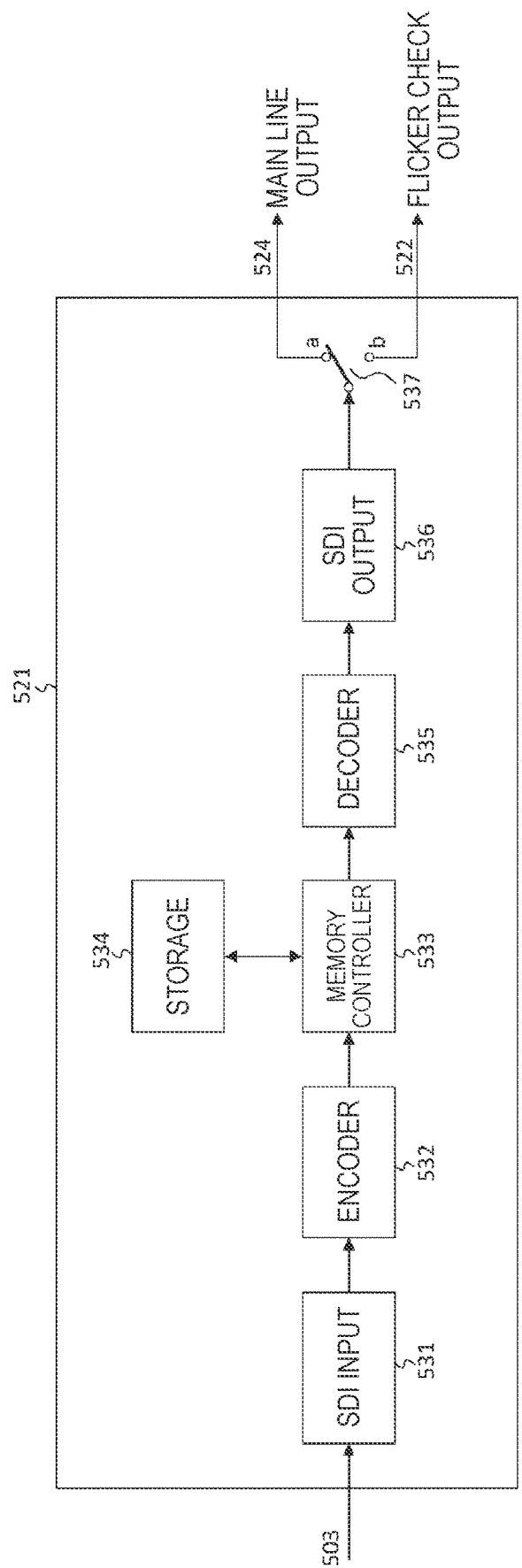
FIG. 14 is a block diagram illustrating an example of a configuration of a server.

FIG. 14 illustrates an example of a configuration of the server 521. The server 521 has an SDI input unit 531, an encoder 532, a memory controller 533, a storage 534, a decoder 535, an SDI output unit 536, and a changeover switch 537.

The SDI input unit 531 receives the image signal 503 of the high frame rate as the SDI signal and extracts the image signal 503 of the high frame rate from the SDI signal thereof. Here, the image signal 503 of the high frame rate may be input by any of one system and multiple systems. For example, in a case in which the image signal 503 of the high frame rate is an image signal of 180 fps, for example, the image signal 503 is supplied by an image signal of 180 fps of one system or an image signal of 60 fps of three systems.

The encoder 532 implements an encoding process by a compression format of, for example XAVC or the like on the image signal of the high frame rate obtained by the SDI input unit 531 to generate a file (recording file). The file generated by the encoder 532 is recorded in the storage 534 and is reproduced under control of the memory controller 533. The memory controller 533 configures a recording and reproducing unit.

In the normal output mode, the memory controller 533 reproduces the image signal of the high frame rate from the storage 534 and outputs the image signal of the high frame rate as it is. On the other hand, in the flicker check mode, the image signal of the high frame rate is reproduced from the storage 534, the image signal of the high frame rate is processed, and the display image signal of the standard frame rate for the flicker check by the first method, the second method, or the third method described above is output. The memory controller 533 configures a recording and reproducing unit and configures a processing unit of the image signal.

The decoder 535 implements a decoding process on the image signal output from the memory controller 533 to obtain an image signal of baseband. The SDI output unit 536 outputs the image signal obtained by the decoder 535 as the SDI signal. In the normal output mode, the changeover switch 537 is connected to a side a, and outputs the image signal (SDI signal) 524 of the high frame rate obtained by the SDI output unit 536 as a main line output. On the other hand, in the flicker check mode, the changeover switch 537 is connected to a side b, and outputs the display image signal (SDI signal) 522 of the standard frame rate for the flicker check obtained by the SDI output unit 536 as a flicker check output.

Figure 15:
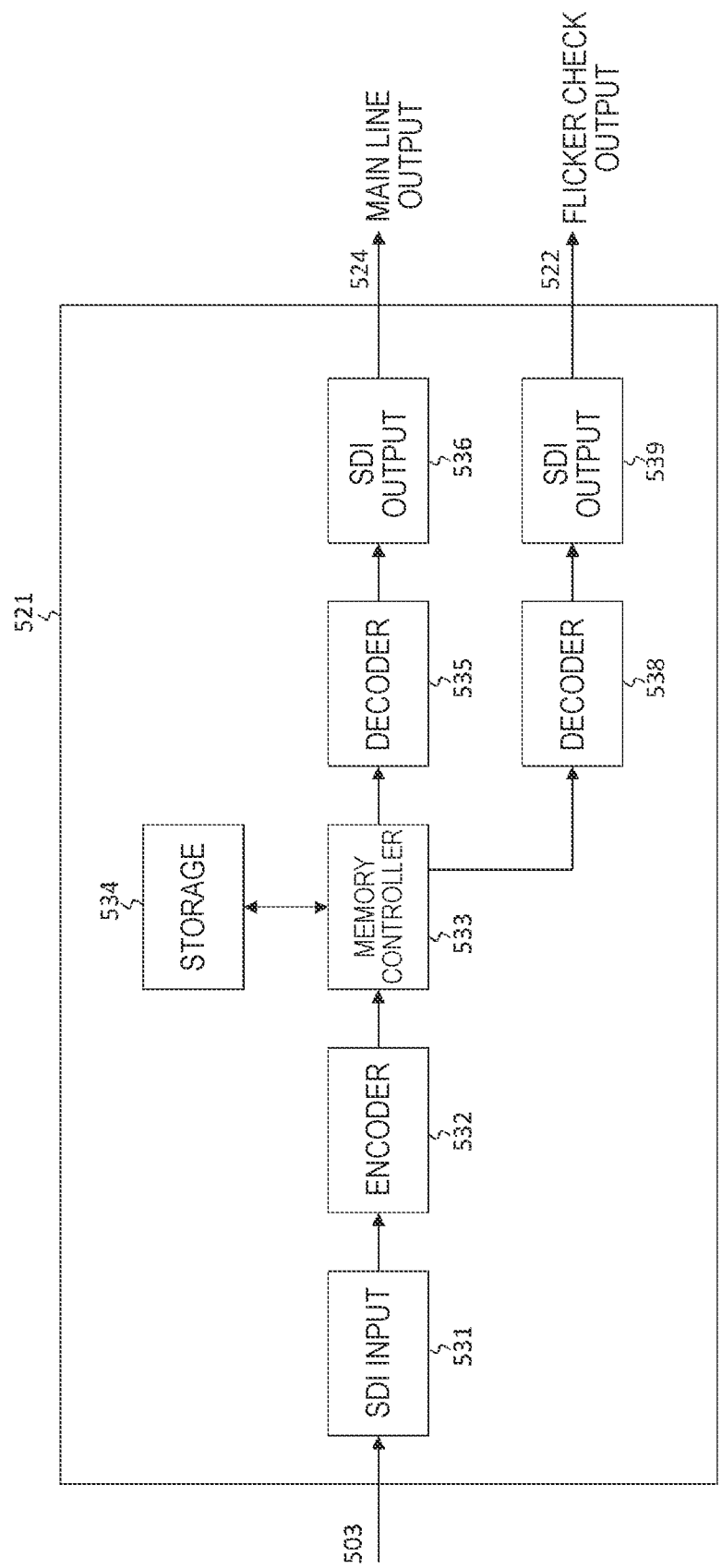
FIG. 15 is a block diagram illustrating another example of the configuration of the server.

FIG. 15 illustrates another example of the configuration of the server 521. In FIG. 15, parts corresponding to those in FIG. 14 are denoted by the same reference numerals. The server 521 has an SDI input unit 531, an encoder 532, a memory controller 533, a storage 534, decoders 535 and 538, and SDI output units 536 and 539.

The SDI input unit 531 receives the image signal 503 of the high frame rate as the SDI signal and extracts the image signal 503 of the high frame rate from the SDI signal thereof. Here, the image signal 503 of the high frame rate may be input by any of one system and multiple systems. For example, in a case in which the image signal 503 of the high frame rate is an image signal of 180 fps, for example, the image signal 503 is supplied by an image signal of 180 fps of one system or an image signal of 60 fps of three systems.

The encoder 532 implements an encoding process by a compression format of, for example XAVC or the like on the image signal of the high frame rate obtained by the SDI input unit 531 to generate a file (recording file). The file generated by the encoder 532 is recorded in the storage 534 and is reproduced under control of the memory controller 533. The memory controller 533 configures a recording and reproducing unit.

The memory controller 533 reproduces the image signal of the high frame rate from the storage 534 and outputs the image signal of the high frame rate as it is. The decoder 535 implements a decoding process on the image signal output from the memory controller 533 to obtain an image signal of baseband. The SDI output unit 536 sets the image signal of the high frame rate obtained by the decoder 535 as the SDI signal and outputs the image signal (SDI signal) 524 of this high frame rate as a main line.

In addition, the memory controller 533 reproduces the image signal of the high frame rate from the storage 534, further processes the image signal of the high frame rate, and outputs the display image signal of the standard frame rate for the flicker check by the first method, the second method, or the third method described above. The memory controller 533 configures a recording and reproducing unit and configures a processing unit of the image signal.

The decoder 538 implements a decoding process on the display image signal of the standard frame rate output from the memory controller 533 to obtain an image signal of baseband. The SDI output unit 539 outputs the display image signal (SDI signal) 522 as a flicker check output by using the display image signal of the standard frame rate obtained by the decoder 538 as the SDI signal.

FIG. 16 illustrates still another example of the configuration of the server 521. In FIG. 16, parts corresponding to those in FIG. 15 are denoted by the same reference numerals. The server 521 has an SDI input unit 531, an encoder 532, a memory controller 533, a storage 534, a decoder 535, SDI output units 536 and 539, and a processing unit 541.

The SDI input unit 531 receives the image signal 503 of the high frame rate as the SDI signal and extracts the image signal 503 of the high frame rate from the SDI signal thereof. Here, the image signal 503 of the high frame rate may be input by any of one system and multiple systems. For example, in a case in which the image signal 503 of the high frame rate is an image signal of 180 fps, for example, the image signal 503 is supplied by an image signal of 180 fps of one system or an image signal of 60 fps of three systems.

The encoder 532 implements an encoding process by a compression format of, for example XAVC or the like on the image signal of the high frame rate obtained by the SDI input unit 531 to generate a file (recording file). The file generated by the encoder 532 is recorded in the storage 534 and is reproduced under control of the memory controller 533. The memory controller 533 configures a recording and reproducing unit.

The memory controller 533 reproduces the image signal of the high frame rate from the storage 534 and outputs the image signal of the high frame rate as it is. The decoder 535 implements a decoding process on the image signal output from the memory controller 533 to obtain an image signal of baseband. The SDI output unit 536 sets the image signal of the high frame rate obtained by the decoder 535 as the SDI signal and outputs the image signal (SDI signal) 524 of this high frame rate as a main line.

The processing unit 541 processes the image signal of the high frame rate obtained by the SDI input unit 531 and outputs the display image signal of the standard frame rate for the flicker check by the first method, the second method, or the third method described above. The SDI output unit 539 outputs the display image signal (SDI signal) 522 as a flicker check output by using the display image signal of the standard frame rate obtained by the processing unit 541 as the SDI signal.

As described above, in the video system 500 shown in FIG. 13, the display signal of the standard frame rate for the flicker check is generated on the basis of image signal 503 (503A and 503B) of the high frame rate, and the display image for the flicker check is presented on the monitor 523, by the server 521. Therefore, the operator of the server is able to easily check the degree of the flicker included in the image signal of the high frame rate. Note that, in the above description, it is assumed that an interface of the server 521 is the SDI. However, the interface of the server 521 is not limited to the SDI, and other interfaces for exchanging a general image signal is also able to be considered.

3. Modified Example

Note that, in the above-described embodiment, an example in which the present technology is applied to the imaging device 1 (refer to FIG. 1) or the server 521 (refer to FIG. 13) and the degree of the flicker included in the image signal of the high frame rate is checked is shown. However, a configuration in which the processing unit (processing circuit) that generates the display image signal of the standard frame rate for the flicker check in the present technology is included in the CCUs 502 and 512 or the switcher 525 is also able to be considered. In addition, for example, in a case in which the video system 500 of FIG. 13 has a configuration in which a baseband processor unit (BPU) is disposed between the cameras 501A and 501B and the CCUs 502A and 502B, a configuration in which the processing unit (processing circuit) that generates the display image signal of the standard frame rate for the flicker check is provided is also able to be considered.

In addition, in the above-described embodiment, an example in which an imaging rate is an integral multiple of the standard frame rate is shown, but the present technology is also able to be applied to a case in which the imaging frame rate is not an integral multiple of the standard frame rate.

Additionally, the present technology may also be configured as below.

(1)

An image signal processing device including:

an image signal processing unit configured to generate a display image signal of a first frame rate from an image signal of a second frame rate higher than the first frame rate, in which the image signal processing unit generates the display image signal of the first frame rate from the image signal of the second frame rate by a frame thinning process and determines a frame to be thinned from a relationship between the second frame rate and a light source frequency.

(2)

The image signal processing device according to (1), in which the image signal processing unit obtains the number of frames to be a flicker period from the second frame rate and the light source frequency, and determines the frame to be thinned so that continuous frames of the number of frames to be the flicker period are present.

(3)

The image signal processing device according to (2), in which the number of frames to be the flicker period is obtained from Math. number of frames to be flicker period=LCM (light source frequency, second frame rate)/ (light source frequency).

(4)

The image signal processing device according to (2), in which the number of frames to be the flicker period is obtained from Math. number of frames to be flicker period=ROUND (second frame rate)/(light source frequency).

(5)

The image signal processing device according to (1), in which the image signal processing unit determines the frame to be thinned so as to extract a frame of which a flicker phase sequentially changes, for each predetermined frame.

(6)

The image signal processing device according to any of (1) to (5), in which the image signal processing unit has a normal process mode and a flicker check mode, and when the image signal processing unit is in the flicker check mode, the image signal processing unit generates the display image signal of the first frame rate from the image signal of the second frame rate by the frame thinning process, and determines the frame to be thinned from the relationship between the second frame rate and the light source frequency.

(7)

An image signal processing method including:

an imaging unit configured to obtain an image signal of a second frame rate higher than a first frame rate; and an image signal processing step of generating a display image signal of a first frame rate by a frame thinning process from an image signal of a second frame rate higher than the first frame rate, in which, in the image signal processing step, a frame to be thinned is determined from a relationship between the second frame rate and a light source frequency.

(8)

An imaging device including:

an imaging unit configured to obtain an image signal of a second frame rate higher than a first frame rate; and an image signal processing unit configured to generate a display image signal of the first frame rate by a frame thinning process from the image signal of the second frame rate, in which the image signal processing unit determines a frame to be thinned from a relationship between the second frame rate and a light source frequency.

(9)

The imaging device according to (8), in which the image signal processing unit obtains the number of frames to be a flicker period from the second frame rate and the light source frequency, and sets the frame to be thinned so that continuous frames of the number of frames to be the flicker period are present.

(10)

The imaging device according to (8), in which the image signal processing unit determines the frame to be thinned so as to extract a frame of which a flicker phase sequentially changes, for each predetermined frame.

(11)

The imaging device according to any of (8) to (10), in which the image signal processing unit has a normal process mode and a flicker check mode, and when the image signal processing unit is in the flicker check mode, the image signal processing unit generates the display image signal of the first frame rate from the image signal of the second frame rate by the frame thinning process, and determines the frame to be thinned from the relationship between the second frame rate and the light source frequency.

(12)

The imaging device according to (11), further including:

a display control unit configured to display that the image signal processing unit is in the flicker check mode on a display unit that displays an image by the display image signal when the image signal processing unit is in the flicker check mode.

(13)

The imaging device according to any of (8) to (12), further including:

a flicker correction unit configured to perform a flicker correction process on the image signal of the second frame rate on the basis of the second frame rate and the light source frequency, in which the image signal processing unit generates the display image signal of the first frame rate from the image signal of the second frame rate of which flicker is corrected.

(14)

The imaging device according to (13), further including:

an operation unit configured to operate the flicker correction process of the flicker correction unit.

(15)

A flicker check method in an imaging device including an imaging unit configured to obtain an image signal of a second frame rate higher than a first frame rate, the flicker check method including:

an image signal process step of generating a display image signal of the first frame rate by a frame thinning process from the image signal of the second frame rate, by an image signal processing unit; and a display control step of displaying an image by the display image signal of the first frame rate on a display unit, by a display control unit, in which, in the image signal process step, a frame to be thinned is determined from a relationship between the second frame rate and a light source frequency.

(16)

An image signal processing device including:

an image signal processing unit configured to generate a display image signal of a first frame rate from an image signal of a second frame rate higher than the first frame rate;

a luminance level detection unit configured to detect a luminance level of a frame of a predetermined number of continuous frames of the image signal of the second frame rate;

a signal superimposing unit configured to superimpose a display signal for displaying the detected luminance level of the frame of the predetermined number of frames on the display image signal.

(17)

The image signal processing device according to (16), in which the predetermined number of frames is the number of frames to be a flicker period obtained from the second frame rate and a light source frequency.

(18)

An image signal processing method including:

an image signal processing step of generating a display image signal of a first frame rate from an image signal of a second frame rate higher than the first frame rate, by an image signal processing unit;

a luminance level detection step of detecting a luminance level of a frame of a predetermined number of continuous frames of the second frame rate, by a luminance level detection unit; and a signal superimposing step of superimposing a display signal for indicating the detected luminance level of the frame of the predetermined number of frames on the display image signal, by a signal superimposing unit.

(19)

An imaging device including:

an imaging unit configured to obtain an image signal of a second frame rate higher than a first frame rate;

an image signal processing unit configured to generate a display image signal of the first frame rate from the image signal of the second frame rate;

a luminance level detection unit configured to detect a luminance level of a frame of a predetermined number of continuous frames of the image signal of the second frame rate; and a signal superimposing unit configured to superimpose a display signal for displaying the detected luminance level of the frame of the predetermined number of frames on the display image signal.

(20)

A server including:

a recording and reproducing unit configured to record an input image signal of a second frame rate higher than a first frame rate in a storage and reproduce an output image signal from the storage; and a processing unit configured to obtain a display image signal of the first frame rate for flicker check on the basis of the input image signal of the second frame rate.

(21)

The server according to (20), in which the processing unit generates the display image signal of the first frame rate from the input image signal of the second frame, by a frame thinning process, and determines a frame to be thinned from a relationship between the second frame rate and a light source frequency.

(22)

The server according to (21), in which the processing unit obtains the number of frames to be a flicker period from the second frame rate and the light source frequency, and determines the frame to be thinned so that continuous frames of the number of frames to be the flicker period are present.

(23)

The server according to (21), in which the processing unit determines the frame to be thinned so as to extract a frame of which a flicker phase sequentially changes, for each predetermined frame.

(24)

The server according to (20), in which the processing unit superimposes a display signal that displays a luminance level of a frame of a predetermined number of continuous frames of the image signal of the second frame rate on an image signal of the first frame rate generated from the input image signal of the second frame rate to generate the display image signal of the first frame rate.

(25)

The server according to (24), in which the predetermined number of frames is the number of frames to be a flicker period obtained from the second frame rate and a light source frequency.

REFERENCE SIGNS LIST 1 imaging device
10 lens unit
20 imaging unit
30 signal correction circuit
31 defect correction circuit
32 flicker correction circuit
40 knee gamma correction circuit
50 finder output generation unit
60 main line signal processing unit
70 viewfinder
80 operation input unit
90 non-volatile memory
100 CPU
321 memory controller
322 memory
323 weighted addition circuit
500 video system
501A, 501B camera
502A, 502B CCU
521 server
523 monitor
525 switcher
531 SDI input unit
532 encoder
533 memory controller
534 storage
535, 538 decoder
536, 539 SDI output unit
537 changeover switch
541 processing unit

What is claimed is:

1. An image signal processing apparatus, comprising:
   at least one processor configured to:
   generate a display image signal of a first frame rate from an image signal of a second frame rate higher than the first frame rate;
   detect a luminance level of a frame of a determined number of continuous frames of the image signal of the second frame rate; and
   output the display image signal and display data for display wherein the display data indicates the detected luminance level of the frame of the determined number of continuous frames.

2. The image signal processing apparatus according to claim 1, wherein the at least one processor is further configured to:
   combine the display image signal and the display data; and
   output the combination of the display image signal and the display data for the display.

3. The image signal processing apparatus according to claim 1, wherein the at least one processor is further configured to superimpose the display data on the display image signal for the display.

4. The image signal processing apparatus according to claim 1, wherein the at least one processor is further configured to operate in one of a normal process mode, a flicker check mode, or a flicker correction mode based on a user input.

5. The image signal processing apparatus according to claim 1, wherein the at least one processor is further configured to output the display data during a flicker check mode.

6. The image signal processing apparatus according to claim 1, further comprising a display unit configured to display an image based on the display image signal.

7. The image signal processing apparatus according to claim 6, wherein the at least one processor is further configured to control display of the luminance level detected in the frame of the determined number of continuous frames as a bar on the displayed image.

8. The image signal processing apparatus according to claim 6, wherein the at least one processor is further configured to control display of the luminance level detected in the frame of the determined number of continuous frames as a numerical value on the displayed image.

9. The image signal processing apparatus according to claim 1, wherein the at least one processor is further configured to obtain the determined number of continuous frames as a number of frames to be a flicker period based on the second frame rate and a light source frequency.

10. The image signal processing apparatus according to claim 1, wherein in a flicker correction mode, the at least one processor is further configured to:
set at least one parameter associated with a flicker correction process based on a user input, wherein
the at least one parameter includes a power supply frequency, a frame rate, and an accumulation type, and
the accumulation type specifies the flicker correction mode; and
execute the flicker correction process on the display image signal based on the set at least one parameter.

11. The image signal processing apparatus according to claim 10, wherein
the accumulation type is one of a first accumulation type, a second accumulation type, or a third accumulation type, and
a weighting coefficient corresponding to an appearance of motion blur is different for each of the first accumulation type, the second accumulation type, and the third accumulation type.

12. The image signal processing apparatus according to claim 10, wherein the at least one processor is further configured to cause a change a flicker correction intensity in the display image signal based on a change in the accumulation type.

13. An image signal processing method, comprising:
in an image signal processing apparatus:
generating a display image signal of a first frame rate from an image signal of a second frame rate higher than the first frame rate;
detecting a luminance level of a frame of a determined number of continuous frames of the image signal of the second frame rate; and
outputting the display image signal and display data for display, wherein the display data indicates the detected luminance level of the frame of the determined number of continuous frames.

14. The image signal processing method according to claim 13, further comprising
combining the display image signal and the display data; and
outputting the combination of the display image signal and the display data for the display.

15. The image signal processing method according to claim 13, further comprising superimposing the display data on the display image signal for the display.

16. The image signal processing method according to claim 13, further comprising outputting the display data during a flicker check mode.

17. The image signal processing method according to claim 13, further comprising:
displaying an image based on the display image signal; and
displaying the luminance level detected in the frame of the determined number of continuous frames as a bar on the displayed image.

18. The image signal processing method according to claim 13, further comprising:
displaying an image based on the display image signal; and
displaying the luminance level detected in the frame of the determined number of continuous frames as a numerical value on the displayed image.

19. The image signal processing method according to claim 13, further comprising:
setting at least one parameter associated with a flicker correction process based on a user input, wherein
the set at least one parameter includes a power supply frequency, a frame rate, and an accumulation type, and
the accumulation type specifies a flicker correction mode; and
executing the flicker correction process on the display image signal based on the set at least one parameter.

20. A non-transitory computer-readable medium having stored thereon computer-executable instructions that, when executed by a processor, cause an image signal processing apparatus to execute operations, the operations comprising:
generating a display image signal of a first frame rate from an image signal of a second frame rate higher than the first frame rate;
detecting a luminance level of a frame of a determined number of continuous frames of the image signal of the second frame rate; and
outputting the display image signal and display data for display, wherein the display data indicates the detected luminance level of the frame of the determined number of continuous frames.

* * * * *